United States Patent [19]
Paleologou et al.

[11] Patent Number: 5,792,441
[45] Date of Patent: Aug. 11, 1998

[54] FIXED-RESIN BED TECHNOLOGIES FOR THE TREATMENT OF THE CHLORINE DIOXIDE GENERATOR EFFLUENT AND FEEDS STREAM

[75] Inventors: Michael Paleologou, Pierrefonds; Rokhsareh Thompson, Pointe Claire; Craig J. Brown, Pickering; Michael Sheedy, North York, all of Canada

[73] Assignees: Pulp and Paper Research Institute of Canada, Pointe Claire; Eco-Tec Limited, Pickering, both of Canada

[21] Appl. No.: 729,148

[22] Filed: Oct. 11, 1996

[51] Int. Cl.⁶ .................. C01D 5/00; C01B 17/90
[52] U.S. Cl. .................. 423/531; 423/522; 423/551; 423/DIG. 14; 210/660; 210/670
[58] Field of Search .................. 423/551, 531, 423/522, DIG. 14; 210/660, 670

[56] References Cited

U.S. PATENT DOCUMENTS

| | | | |
|---|---|---|---|
| 3,067,007 | 12/1962 | Hatch et al. | 23/105 |
| 3,099,529 | 7/1963 | Hatch et al. | 23/102 |
| 3,810,969 | 5/1974 | Schlumberger | 423/478 |
| 3,975,505 | 8/1976 | Fuller | 423/478 |
| 4,081,520 | 3/1978 | Swindells et al. | 423/478 |
| 4,104,365 | 8/1978 | Howard et al. | 423/531 |
| 4,325,934 | 4/1982 | Swindells et al. | 423/478 |
| 4,483,740 | 11/1984 | Parkinson et al. | 159/47.3 |
| 4,678,654 | 7/1987 | Holmström et al. | 423/478 |
| 4,678,655 | 7/1987 | Twardowski | 423/478 |
| 4,798,715 | 1/1989 | Hardee et al. | 423/478 |
| 4,915,927 | 4/1990 | Lipsztajn et al. | 423/472 |
| 5,064,514 | 11/1991 | Caulfield et al. | 204/103 |
| 5,084,148 | 1/1992 | Kaczur et al. | 204/95 |
| 5,108,560 | 4/1992 | Cawfield et al. | 204/103 |
| 5,116,595 | 5/1992 | Scribner et al. | 423/477 |
| 5,174,868 | 12/1992 | Lipsztajn et al. | 204/95 |
| 5,223,103 | 6/1993 | Kaczur et al. | 204/95 |
| 5,242,552 | 9/1993 | Coin et al. | 204/95 |

FOREIGN PATENT DOCUMENTS

| | | |
|---|---|---|
| 1118184 | 2/1982 | Canada. |
| 40-14246 | 7/1940 | Japan. |
| 59-35700A | 2/1984 | Japan. |
| 63-134512A | 6/1988 | Japan. |

OTHER PUBLICATIONS

Vulikh et al. "Ion Exchange Production of Acids from Salts", Metody Poluch. Khim. Reaktiv Prep., 16, pp. 5–13, 1967 no month.

Taube, H. and Dodgen, H., J. Amer. Chem. Soc. 71:3330–3336 (1949) Oct. "Applications of Radioactive ...".

(List continued on next page.)

Primary Examiner—Gary P. Straub
Assistant Examiner—Timothy C. Vanoy
Attorney, Agent, or Firm—Swabey Ogilvy Renault

[57] ABSTRACT

A process employing a fixed-resin bed Acid Retardation Unit (ARU) to separate spent acid from chlorine dioxide generators into a de-acidified sodium sulfate component and a purified sulfuric acid component. The de-acidified sodium sulfate produced is returned to the chemical recovery cycle of the kraft mill in place of acidic chlorine dioxide generator effluent thereby avoiding the destruction of alkalinity in pulp mill liquors. In addition, sulfuric acid is purified providing an opportunity for reuse in various mill applications, and/or concentrated and recycled to the generator. Alternatively, to avoid high evaporation costs, the purified acid can be used to regenerate a cation-exchange unit (CEU) used in the conversion of sodium chlorate to a sodium chlorate/chloric acid mixture which is fed to the generator in place of sodium chlorate and sulfuric acid. Using this approach, the sulfuric acid requirement of chlorine dioxide generators and, in turn, the amount of acidic generator effluent can be reduced. The process is applicable to both atmospheric and subatmospheric chlorine dioxide generators. In the latter case, the concentration of the purified sulfuric acid from the ARU or any other acid separation system can be increased by using a portion of it to dissolve the sodium sesquisulfate by-product from such generators.

20 Claims, 10 Drawing Sheets

OTHER PUBLICATIONS

Luther, R. and McDougall, F.H., Z. Physik Chem. 62:199–242(1908) no month "Die Kinetik . . . ".

Mendiratta, S.K. CPPA 79th Ann. Mtg. Tch. Sec. CPPA A193–A196, Montreal, Que. (Jan. 1993) "Extra Low Aox . . . ".

Charles, J. Pulp & Paper Can. 88(10): (1987) no month, pp. 43–44 "Stora Mill Will . . . ".

Smook, G.A. Handbook for Pulp and Paper Technologists, Joint Textbook Committee of the Paper Industry, 158–160(1982) no month.

Szell, M. & Fredette M., CPPA 80th Ann. Mtg. Tech. Sec. Montreal, Que. A211–A215 (Jan. 1994) "The Development of the ERCO Rio Process".

Michaud et al, "Ion Exchange Resin", Jan. 1990, pp. 44–47, 51.

Paleologou et al. J. Pulp and Paper Sci., 20(2), J39–J45 (1994) Feb. "Sodium Chlorate Splitting . . . ".

Paleologou et al. Pulp and Paper Canada, 95(10), T386–T390 (1994) no month "Membrane Technologies . . . ".

Hatch et al, "Acid Retardation . . . ", I&EC Process Design and Development.

Paleologou et al., J. Pulp Paper Sci. 22(1), J1–J7 (1996) Jan. "Bipolar Membrane . . . ".

Indu, B. Hoq, M.F. and Ernst, W.R., AIChE Journal, 37(11):1744–1748 (1991) Nov. "Acidity of Sulfuric Acid . . . ".

FIXED-RESIN BED TECHNOLOGIES FOR THE TREATMENT OF THE CHLORINE DIOXIDE GENERATOR EFFLUENT AND FEEDS STREAM

BACKGROUND OF THE INVENTION

1. Field of the Invention

This invention relates to a process for the treatment of chlorine dioxide generator effluent, more especially an effluent which contains sulfuric acid and sodium sulfate. In particular, the process of the invention may be exploited for preventing the destruction of alkalinity in pulp mill liquors by spent chlorine dioxide generator acid which is recycled to the recovery cycle, while maintaining the sodium and sulphur requirements of the recovery cycle. The sulfuric acid content of the spent generator acid is purified of sodium sulfate contamination and may be returned to the generator or used in various other applications at the mill site.

2. Description of the Prior Art

The use of chlorine in pulp bleaching has rapidly declined in order to eliminate the formation of chlorinated dioxins and to meet AOX (adsorbable organically-bound halogen) regulations. At the present time, chlorine dioxide is the preferred replacement for chlorine in bleaching operations because its use allows environmental goals to be met while retaining the quality of the final product.

The production of chlorine dioxide at pulp mills involves two main steps. In a first step, sulfuric acid reacts with sodium chlorate to produce chloric acid and sodium sulfate by-product (Reaction 1). In a second step, the chloric acid is reduced to chlorine dioxide by reacting with a reducing agent such as methanol, sulphur dioxide, chloride or hydrogen peroxide (Reaction 2).

$$2\,NaClO_3 + H_2SO_4 \rightarrow Na_2SO_4 + 2HClO_3 \tag{1}$$

$$HClO_3 + Reductant \rightarrow ClO_2 + Oxidized\ Product \tag{2}$$

The rate of chlorine dioxide formation in most generators is a strong function of the free hydrogen ion concentration (Taube, H. and Dodgen, H., *J. Amer. Chem. Soc.*, 71:3330–3336 (1949); Luther, R. and McDougall, F. H., *Z. Physik. Chem.*, 62:199–242 (1908)):

$$d[ClO_2]/dt = k[H^+]^{3-4}[ClO_3^-][Cl^-]^2 \tag{3}$$

The free hydrogen ion concentration in chlorine dioxide generators is limited, however, by the following equilibrium (Mendiratta, S. K., CPPA 79th Ann. Mtg. Tech. Sec., A193–A196, Montreal, Que. (Jan. 1993); Indu, B., Hoq, M. F. and Ernst, W. R., *AIChE Journal*, 37(11):1744–1748 (1991)):

$$Na_2SO_4 + HClO_3 \rightleftharpoons NaHSO_4 + NaClO_3 \tag{4}$$

In Reaction 4, a fraction of the free hydrogen ions from the chloric acid formed in Reaction 1 forms sodium bisulfate (NaHSO₄). In order to enhance the rate of chlorine dioxide production, substantial amounts of sulfuric acid (well above stoichiometric) are usually added in most generators to push the equilibrium in Reaction 4 toward the left. The excess sulfuric acid added, provides free hydrogen ions to the reaction mixture through its dissociation in aqueous solutions:

$$H_2SO_4 \rightleftharpoons HSO_4^- + H^+ \tag{5}$$

As a result of the excess sulfuric acid added to ensure a high rate of production, chlorine dioxide generator effluents are usually very acidic. For example, in the case of atmospheric generators, the Modified Mathieson produces 2.2 t of $H_2SO_4$/t of $ClO_2$, the Mathieson, 1.7 t of $H_2SO_4$/t of $ClO_2$, and the Solvay 1.6 t of $H_2SO_4$/t of $ClO_2$ (Charles, J., *Pulp Paper Can.*, 88(10):43–44 (1987); Smook, G. A., Handbook for Pulp and Paper Technologists, Joint Textbook Committe of the Paper Industry, 158–160 (1982)). The HP-AT™ generator, recently developed by Eka Nobel Inc., produces 1.4 to 1.9 t of $H_2SO_4$/t of $ClO_2$ depending on reaction volume, configuration and operating conditions. The subatmospheric generators, such as the R8 and the SVP-LITE, produce relatively small amounts of sulfuric acid as by-product (0.24 t of $H_2SO_4$/t of $ClO_2$) because they are designed to maintain relatively high free acid concentrations in the generator through vacuum evaporation and continuous precipitation and filtration of the excess sodium sulfate (in the form of sodium sesquisulfate) from the reaction solution. Despite the numerous advantages of subatmospheric generators, including the low consumption and generation of residual sulfuric acid, many mills have not yet installed these systems because of the required high capital investment (several million dollars).

In most mills, a portion of the spent acid from the chlorine dioxide generator is returned to the recovery cycle for sodium and sulphur make-up either in its untreated form or after being neutralized with sodium hydroxide. The remaining spent acid is usually neutralized with lime or lime mud and sewered in the form of calcium sulfate. Since, however, the solubility of calcium sulfate is very low, a major portion of this salt ends up in the primary and/or secondary sludge which leads to increased sludge dredging and disposal costs. With increased system closure, this problem will become more severe since reduced effluent flows will lead to an increase in the portion of the calcium sulfate that precipitates out in the effluent treatment system. The portion of spent acid which is returned to the recovery cycle, is usually added to black liquor (BL) or green liquor (GL). Because of the high acid content of spent acid, as well as the high alkalinity of these liquors, any one or more of the following neutralization reactions are expected to occur:

$$H_2SO_4 + NaOH \rightarrow Na_2SO_4 + H_2O\,(GL\ \&\ BL) \tag{6}$$

$$H_2SO_4 + Na_2CO_3 \rightarrow Na_2SO_4 + CO_2 + H_2O\,(GL\ \&\ BL) \tag{7}$$

$$H_2SO_4 + Na_2S \rightarrow Na_2SO_4 + H_2S\,(GL\ \&\ BL) \tag{8}$$

$$H_2SO_4 + NaOR \rightarrow Na_2SO_4 + HOR\,(BL) \tag{9}$$

where OR stands for organic components in the phenolic or carboxylic acid form.

As a result of the above reactions, large amounts of sodium hydroxide must be added to the mill white liquor to make up for the caustic values neutralized by generator spent acid in the black or green liquors. Moreover, the sulfuric acid present in spent acid is wasted in the various neutralization reactions. Given this situation, it would be useful to:

a) prevent the destruction, by spent acid, of alkalinity in pulp mill liquors while maintaining the sodium and sulphur requirements of the recovery cycle;

b) recover and use the sulfuric acid component of the portion of spent acid which is at present returned to the recovery cycle; and c) recover and use the sulfuric acid component of the portion of spent acid which is at present sewered.

In addressing any one or more of these questions, various efforts have been made to separate spent acid from chlorine dioxide generators into its neutral and acid components. In the case of atmospheric generators, Howard and Lobley (U.S. Pat. No. 4,104,365 (Aug. 1, 1978)) have described a process of separating sulfuric acid from spent acid by simultaneously adding to the spent liquor, a water-soluble alcohol or ketone and water; the resulting solid (sodium sulfate) is then separated from the solution to leave an aqueous solution of sulfuric acid. Parkinson et al. (U.S. Pat. No. 4,483,740, Nov. 20, 1984) proposed a three-stage evaporation/crystallization process for spent generator (Mathieson or Solvay) acid which ultimately produces sodium sulfate saltcake and sulfuric acid. Twardowski (U.S. Pat. No. 4,678,655, July 7, 1987) described a process in which effluent acid from the generator is subjected to diffusion-dialysis across an anion-exchange membrane to preferentially transfer sulfuric acid from the effluent acid stream to a recipient aqueous medium while sodium sulfate remained in the waste stream.

In the case of subatmospheric generators, several approaches have been proposed for removing sulfuric acid from sodium sesquisulfate saltcake. For example, Fuller (U.S. Pat. No. 3,975,505, Aug. 17, 1976) proposed passing crystalline by-product from chlorine dioxide generators countercurrent to warm wash water in a washing column, which has the effect of converting the sodium acid sulfate to neutral sodium sulfate. A problem with this approach is that it significantly increases the evaporative load on the generator. Swindells and Fredette (U.S. Pat. No. 4,325,934, April 30, 1982) described another process which involves contacting the solid phase by-product sodium acid sulfate from an R8 chlorine dioxide generator with a mixture of water and methanol to produce solid phase neutral sodium sulfate. Acid values recovered by this process are recycled to the chlorine dioxide generator, while excess methanol is stripped from the acidic solution through a costly stripping step. Dick and Cowley (Canadian Patent No. 1,118,184, Feb. 16, 1982) described a process in which the solid phase by-product from the R8 process is contacted with warm water to effect conversion of by-product sodium sesquisulfate to neutral sodium sulfate (metathesis) in a multi-stage decantation-washing operation. Drawbacks of this approach are that the equipment was found to plug frequently and large amounts of water are required (approximately three to four additional tonnes of water per tonne of chlorine dioxide), increasing the evaporative load on the generator. A partial solution to these problems was suggested by Scribner et al. (U.S. Pat. No. 5,116,595, May 26, 1992) who proposed that the metathesis reaction be effected by contacting the crystalline sodium sesquisulfate with an aqueous sodium chlorate solution (R10 process). This process was implemented in a number of mills with R8 generators (CPPA 80th Ann. Mtg. Tech. Sec., Montreal, Que., A211–A215 (January 1994)). In this process, the amount of solvent mixed with the salt cake is carefully controlled so that all the acid is dissolved, leaving a neutral solid salt of anhydrous sodium sulfate. After mixing in the solvent, the anhydrous sodium sulfate is separated by a vacuum filter and the acid filtrate is made available for reuse in the generator or elsewhere in the pulp mill. Similar systems are now offered by other suppliers such as Eka Nobel.

While the latter acid recovery systems for subatmospheric chlorine dioxide generators are undoubtedly effective, they have several serious disadvantages:

a. These processes are complex and difficult to operate since one must handle solids and slurries as opposed to clear solutions.

b. An additional filter is required to separate the sodium sesquisulfate crystals from the mother liquor, which is recycled back to the generator.

c. Under some conditions, it is reported that very fine crystals are produced which are very difficult to separate out.

d. While the sodium sulfate produced is virtually free of acid, only about 60% of the sodium sulfate in the saltcake is recovered, the balance being re-dissolved with the acid which is recycled back to the generator. This 'dead load' of sodium sulfate must again be crystallized out, so that the solids loading on the filter is appreciably increased. As a result, the filter originally installed to separate the sodium sesquisulfate saltcake from the generator liquor becomes inadequate and must be replaced with a larger filter. Although the original filter can normally be employed for separation of the de-acidified sodium sulfate, considerable expense is involved in making the necessary changes to the installation.

e. As a result of the above complexities, even under optimal conditions, the installed cost of the additional filter and its associated equipment and controls is appreciable.

Moreover, in the processes of the prior art, in order to reduce the amount of sodium chlorate which is lost with the saltcake, the saltcake is normally washed with fresh water, the washings being recycled back to the generator. This recycled water imposes an evaporation load on the generator. Unfortunately, a portion of the sodium sulfate cake is dissolved by this washing, thereby further increasing the dead load of sodium sulfate which must ultimately be re-crystallized.

Another aspect of this invention deals with the cost-effective production of sodium chlorate/chloric mixtures from sodium chlorate using a fixed-resin bed ion-exchange system. As shown above, no sulfate or sodium ions are needed for the production of chlorine dioxide (reaction 2). In fact, the presence of these ions reduces the concentration of free hydrogen ions in the generator and, therefore, it actually has a negative impact on the kinetics of chlorine dioxide production (equation 3). Moreover, the presence of these ions in the generator leads to the generation of excessive amounts of acidic sodium sulfate by-product. The only chemical species that are needed for the production of chlorine dioxide are: chloric acid (free hydrogen ions and chlorate ions), chloride ions and stoichiometric amounts of the reducing agent. This means that as long as one delivers to the generator a solution of pure chloric acid of a concentration that is at least as high as the concentration of free hydrogen ions in existing chlorine dioxide generators, then, the production rate will be maintained unaltered. If the concentration of the delivered chloric acid is higher than this minimum concentration, then it should be possible to increase the capacity of such generators.

For the reasons stated above, a number of investigators in recent years have examined ways of generating chloric acid, other than the reaction of sodium chlorate with sulfuric acid.

Shimonis (Elektrokhimiya, 11(11), 1694–1698 (1975)) discusses the formation of chloric acid from hydrochloric acid through the oxidation of chloride in an electrolysis cell. Even though this approach can generate dilute chloric acid solutions in high yields (95–98%), these are significantly reduced at stronger hydrochloric acid concentrations because of the reaction of this acid with the chloric acid product to produce chlorine and chlorine dioxide. Alternatively, chloric acid can be produced through the direct anodic oxidation of hypochlorous acid, HOCl (Caulfield, D. W. and Loftis, H. J., U.S. Pat. No. 5,064,514, Nov. 12, 1991; Cawfield et al. U.S. Pat. No. 5,108,560, Apr.

28, 1992). This process, however, requires a chloride-free, inexpensive source of hypochlorous acid while the yields (about 50%) and current efficiencies (60 to 90%) obtained are relatively low as a result of three competing anodic reactions. A two-compartment electrolytic process has been developed for the conversion of sodium chlorate to sodium chlorate/chloric acid mixtures and sodium hydroxide (Lipsztajn, M., Fredette, M. C. and and Twardowski, Z., U.S. Pat. No. 5,174,868, Dec. 29, 1992). In this case, however, the current efficiency for acid (2.1M chloric acid) and base production, is limited to about 50% because of the competing transport of hydrogen ions from the anode to the cathode compartment. An additional current efficiency loss arises from the anodic formation of perchloric acid through the oxidation of chloric acid. To minimize these problems, Kaczur et al. (U.S. Pat. Nos. 5,084,148 and 5,223,103) used a three-compartment electrolytic process, in which sodium chlorate is fed into an ion-exchange compartment separated from the anolyte and catholyte compartment by two cation-selective membranes. In an alternate three-compartment process configuration, a diaphragm separator is used adjacent to the anode compartment and chlorate ions from a center compartment are transported into the anolyte compartment to form chloric acid (Coin, R. J. et al., U.S. Pat. No. 5,242,552, Sep. 7, 1993). Two disadvantages of the three- over the two-compartment configurations, however, are the higher capital and operating costs associated with having an additional compartment. Electrodialytic methods employing bipolar membranes in addition to cation-selective and/or anion-selective membranes for the production of pure chloric acid (and/or sodium chlorate/chloric mixtures) and sodium hydroxide have recently been reported (Lipsztajn et al., U.S. Pat. No. 4,915,927, Apr. 10, 1990; Paleologou et al., J. Pulp & Paper Sci., 20(2), J39–J45 (1994); Paleologou et al., Pulp & Paper Canada, 95(10), T386–T390 (1994); Paleologou et al., J. Pulp Paper. Sci., 22(1), J1–J7 (1996)). Despite the relatively low capital and operating costs (energy consumption) associated with these systems as compared to electrolytic systems, the major limitations are the stability of the membranes and in particular the anion-selective membranes and the anion-selective components of the bipolar membranes in chloric acid solutions.

Fixed-resin bed ion-exchange approaches have been demonstrated for the preparation of chloric acid from readily available alkali metal chlorates (Vulikh, A. I. et al., Metody Poluch. Khim. Reaktiv Prep., 16, 5–13 (1967), Schlumberger, A. A., U.S. Pat. No. 3,810,969, May 14, 1974 and Hardee, K. L. and Sacco, A. R., U.S. Pat. No. 4,798,715, Jan. 17, 1989). These publications describe the preparation of chloric acid concentrations up to about 4.5M using cation-exchange resins. The economic viability of these methods, however, is compromised by a number of factors: (a) the available hydrocarbon-based cation-exchange resins have limited durability due to their oxidation by chloric acid which attacks the divinylbenzene crosslinks present in these resins (b) these processes require the periodic regeneration of the resins using expensive purchased acids.

In none of the aforementioned systems, however, is suggestion made for the application of suitable fixed-resin bed ion-exchange technology to the treatment of the spent acid from atmospheric or subatmospheric chlorine dioxide generators in such a way as to avoid the problems of the prior art; in particular no mention is made of using a fixed-resin bed acid retardation unit (ARU) to produce a de-acidified sodium sulfate solution that can be returned to the recovery cycle without destroying alkaline components in pulp mill liquors and a purified sulfuric acid stream that can be used in other mill applications including the regeneration of a fixed-resin bed cation-exchange unit (CEU) for the conversion of sodium chlorate to a sodium chlorate/chloric acid mixture prior to feeding it into the generator. Eventhough, Twardowski (U.S. Pat. No. 4,678,655, Jul. 7, 1987) describes a diffusion dialysis process for the de-acidification of spent acid from atmospheric chlorine dioxide generators, no suggestion is made for using such a system for subatmospheric generators. Furthermore, in none of the aforementioned systems dealing with subatmospheric generators is suggestion made of using the purified acid from a suitable fixed-resin bed ARU or any other acid separation process (e.g. diffusion dialysis, electrodialysis or nanofiltration) to dissolve the sodium sesquisulfate by-product from such generators in a way that would increase the concentration of the recovered acid to sufficiently high levels to enable its return to the chlorine dioxide generator.

SUMMARY OF THE INVENTION

It is an object of this invention to prevent the destruction of alkalinity in pulp mill liquors by spent acid while maintaining the sodium and sulphur requirements of the recovery cycle.

It is a further object of this invention to recover and use the sulfuric acid component of the portion of spent acid which is at present returned to the recovery cycle.

It is a still further object of this invention to recover and use the sulfuric acid component of the portion of spent acid which is at present sewered.

It is a particular object of this invention to provide a process for the treatment of chlorine dioxide generator effluent with recovery of chemicals.

In accordance with the invention there is provided a process for the treatment of a chlorine dioxide generator effluent from a chlorine dioxide generator, which effluent contains sulfuric acid and sodium sulfate comprising the steps of:

a. feeding the effluent containing sulfuric acid and sodium sulfate to a fixed-resin bed acid retardation unit incorporating a particulate quaternary ammonium resin wherein the acid is sorbed by the resin and sodium sulfate is rejected to produce a de-acidified sodium sulfate solution and recovering said deacidified solution; and b. eluting acid sorbed in said acid retardation unit with water, to recover a purified sulfuric acid solution.

In accordance with one aspect of the invention there is provided a process for the treatment of subatmospheric chlorine dioxide generator effluent by-product salt cake, containing sulfuric acid and sodium sulfate comprising the steps of:

i) dissolving the by-product salt cake in water to form a solution;

ii) feeding the resulting solution containing sulfuric acid, sodium sulfate and chloride to an acid separation system to separate said sulfuric acid from said sodium sulfate and recovering a deacidified solution, and iii) recovering separated sulfuric acid from step ii).

DESCRIPTION OF PREFERRED EMBODIMENTS

Suitably the chlorine dioxide effluent or the solution formed by dissolving the by-product salt cake in water is treated with a reducing agent to destroy residual chlorine compounds prior to the separation step. This reduction typically results in chloride in the effluent.

Thus in the case of atmospheric chlorine dioxide generators, the process aspect of the invention typically comprises the following steps:

(a) a reducing agent such as sulphur dioxide, sodium sulphite, methanol or hydrogen peroxide is introduced into the spent acid storage tank to destroy the residual sodium chlorate, chlorine dioxide and chlorine, (b) the treated solution is introduced into a fixed-resin bed ARU in which the sulfuric acid is taken up by the resin thus producing a de-acidified sodium sulfate solution which is directed to the recovery cycle for sodium and sulphur make-up, (c) the acid is eluted from the resin bed through the addition of water to the ARU and directed to various possible applications at the mill site and/or concentrated through evaporation and returned to the chlorine dioxide generator.

Alternatively, the acid is directed to step (d) below.

(d) purified sulfuric acid from step (c) is used to regenerate a fixed-resin bed CEU in the sodium form thereby producing a de-acidified sodium sulfate solution which is directed to the recovery cycle for sodium and sulphur make-up, (e) a sodium chlorate solution is fed into the fixed resin bed CEU ((hydrogen form) thereby converting a fraction of it to chloric acid, (f) the sodium chlorate/chloric acid mixture is fed into a chlorine dioxide generator for the production of chlorine dioxide and acidic sodium sulfate by-product, (g) the acidic sodium sulfate by-product is directed to step (a) above.

In the case of subatmospheric chlorine dioxide generators, the process aspect of this invention comprises the following steps:

(i) the sodium acid sulfate saltcake by-product is dissolved in water or acid-containing solution (ii) as step (a) above (iii) the treated solution is introduced into a fixed-resin bed ARU or any other acid separation system (e.g. diffusion dialysis, electrodialysis, nanofiltration) thus producing a de-acidified sodium sulfate solution which is directed to the recovery cycle for sodium and sulphur make-up and purified sulfuric acid, (iv) the separated sulfuric acid from step (iii) is withdrawn from the acid separation system and directed to various possible applications at the mill site and/or concentrated through evaporation and returned to the chlorine dioxide generator. Alternatively, the acid is directed to step (d) above or (v) below, (v) a first portion of the sulfuric acid-containing solution produced in (iv) is used for the dissolution of sodium acid sulfate cake in step (i) instead of water thereby increasing the concentration of the acid product, (vii) a second portion of the sulfuric-acid containing solution produced in step (iv) is returned to the chlorine dioxide generator or is directed to steps (d to g) above and/or other applications at the mill site.

Using this approach, the destruction of alkalinity in pulp mill liquors can be prevented thereby reducing the caustic make-up requirements to the recovery cycle. In addition, the sulfuric acid component of the portion of spent acid which is returned to the recovery cycle is recovered as well as the portion of sulfuric acid in spent acid which is presently sewered. Since in many mills most of the spent acid must be processed in order to meet the sodium and sulphur requirements of the recovery cycle, a major step towards inorganics system closure can be achieved through the implementation of this technology at the mill site. The invention also provides apparatus for carrying out the process.

(i) Solutions Treated

The aqueous solution to be treated may be the spent acid from a chlorine dioxide generator of any type. In the case of atmospheric generators (e.g. Mathieson, Modified Mathieson, Solvay and HP-A™) the spent acid is usually an aqueous solution of sodium sulfate and sulfuric acid with some residual levels of chlorate, chlorine dioxide and chlorine. In the case of subatmospheric generators, the effluent from the generator is in the form of an acidic salt named sodium sesquisulfate (solid form). The latter may be dissolved in water at the solubility limit of sodium sulfate at any given temperature, prior to introduction to the system.

(ii) Pre-treatment of the chlorine dioxide generator spent acid

A common mechanism of ion-exchange resin degradation is oxidation which breaks down the crosslinking of the polymer backbone. Oxidants such as chlorine, chlorine dioxide, ozone, oxygen, peroxide and UV light, combined with heat, speed up the de-crosslinking of the resins. Strong acids such as nitric, chromic and chloric acids have oxidizing capabilities as well (Michaud, C. and Brodie, D. F., Water Conditioning and Purification, 44–51 (January 1990)). As the degree of cross-linking decreases, the polymer structure becomes weaker and more open and both its water permeability and residual moisture increase. Such beads are more easily broken and the fragments are subsequently washed out of the column. The moisture content of the resin is a convenient measure of the degree of cross-linkage of the resin which is otherwise very difficult to determine without complex equipment. In addition to the physical breakdown of the resin due to de-crosslinking, chemical degradation of the ion-exchange functional groups can occur as well; this is largely dependent on the nature of the functional groups, the solutions being treated and the temperature. The total ion-exchange capacity is a measure of the number of ion-exchange groups on the resin that continue to remain intact.

As mentioned above, the spent acid contains residual levels of chlorate, chlorine dioxide and chlorine which can create a problem with the long-term durability of the ARU resin. For this reason, chlorine dioxide, chlorine and chlorate may have to be destroyed or removed prior to the introduction of the chlorine dioxide generator spent acid into the ARU system. This can be achieved by treating these solutions with either sodium sulphite, sulphur dioxide or other suitable reducing agents (e.g. methanol, hydrogen peroxide, etc.).

Under acidic conditions, sodium sulphite reacts with chlorate, chlorine dioxide and chlorine according to the following equations:

$$NaClO_3 + 3\ Na_2SO_3 + 3\ H_2SO_4 \rightarrow NaCl + 6\ NaHSO_4 \tag{10}$$

$$2\ ClO_2 + 5\ Na_2SO_3 + H_2O \rightarrow 2\ NaCl + 4\ Na_2SO_4 + H_2SO_4 \tag{11}$$

$$Cl_2 + Na_2SO_3 + H_2O \rightarrow 2\ NaCl + H_2SO_4 \tag{12}$$

Alternatively, chlorate, chlorine dioxide and chlorine can be destroyed using sulphur dioxide as illustrated in the following reactions:

$$NaClO_3 + 3\ SO_2 + 3\ H_2O \rightarrow NaCl + 3\ H_2SO_4 \tag{13}$$

$$2\ ClO_2 + 5\ SO_2 + 6\ H_2O \rightarrow 2\ HCl + 5\ H_2SO_4 \tag{14}$$

$$Cl_2 + SO_2 + 2\,H_2O \rightarrow 2\,HCl + H_2SO_4 \quad (15)$$

The destruction of these species using sulphur dioxide can be monitored and controlled using an ORP (oxidation/reduction potential) sensor and/or a calorimetric sensor. Other chemical reducing agents such as methanol or hydrogen peroxide may also be employed without departing from the scope of this invention. The reduction can also be accomplished electrochemically or catalytically. Alternatively, the residual chlorate, chlorine dioxide and chlorine species could be removed from solution using any suitable separation technique. An additional option would be to use resins that are less susceptible to attack by oxidizing chemicals. The treated solution can then be fed to a filter, if necessary, for the removal of suspended solids prior to treatment by the fixed-resin bed ARU or any other acid separation process.

(iii) Recovery of acid values

In accordance with the invention it was found that chlorine dioxide generator spent acid can be separated into a de-acidified sodium sulfate solution and a purified sulfuric acid solution using an ion-exchange process. This process employs strong base anion exchange resins (quaternary ammonium groups) which have the ability to sorb acids from solution while excluding salts of these acids (Hatch, M. J. and Dillon, J. A., Industrial and Engineering Chemistry: Process Design and Development, 2(4), 253, October 1963; Hatch, M. J. and Dillon, J. A. U.S. Pat. No. 3,067,007, Dec. 4, 1962; Hatch, M. J. and Dillon, J. A. U.S. Pat. No. 3,099,529, Jul. 30, 1963, the teachings of which are incorporated herein by reference). The process, known as "acid retardation", is reversible in that the acid can be readily de-sorbed from the resin with water. It is thus possible, by alternately passing contaminated acid and water through the bed of this resin, to separate the free acid from the metal salt.

The purified sulfuric acid produced by water elution of the fixed-resin bed ARU can be directed to several applications in the mill, including the following:

i) recycling to the chlorine dioxide generator of all or part of the purified acid after concentration through evaporation;

ii) regeneration of a cation-exchange unit used to convert a fraction of sodium chlorate feed to the generator to chloric acid;

iii) regeneration of cation-exchange units used to treat boiler feed water;

iv) acidulation of tall oils;

v) brownstock acidification for pitch control;

vi) pH adjustment prior to bleaching; and vii) removal of non-process metals prior to peroxygen bleaching stages.

Chloride ion is added deliberately and/or generated in chlorine dioxide generators as a by-product and is contained in the spent generator effluent. In addition, chloride will be generated in the reduction step immediately prior to treatment of the generator effluent solution with the fixed-resin bed ARU. Based upon normal ion-exchange selectivities, one would expect that chloride, being a monovalent anion would have less preference than divalent sulfate on the strong base anion-exchange resin employed in the ARU. On this basis, one would predict that chloride, as hydrochloric acid, would be taken up less preferentially than sulfuric acid so that the acid product would be depleted in chloride while the salt by-product would, consequently, be enriched in chloride ion. This would be undesirable in the case of the present invention because recycle of de-acidified generator effluent solution to the kraft recovery cycle would result in the accumulation of chloride ion therein. The presence of chloride ion in kraft process liquors is known to have a number of adverse effects including increased corrosion of metallic components and clogging of the recovery boiler.

It has been found that, under the conditions employed in this invention, a much greater proportion of the chloride reports to the purified acid stream as compared to the de-acidified sodium sulfate stream. As a result, recycle of the de-acidified generator effluent solution can be performed with no adverse consequences due to chloride contamination. Moreover, if the purified acid is recycled back to the chlorine dioxide generator, the recovered chloride can take part in the generation of chlorine dioxide and improve the performance of the process.

While the precise reason for this apparent shift in selectivity for chloride by the fixed-resin bed ARU is not known, it is believed that it is due to a shift in the ion-exchange selectivities caused by the relatively high concentration of sulfuric acid in the feed to the ARU of this invention (ie. ca 450–500 g/L). Similar behaviour was observed in another ARU application involving the recovery of sulfuric acid from acidic zinc-containing electrolyte bleed solutions from zinc electrowinning circuits (Brown, C. J., Recovery of sulfuric acid from refinery electrolyte bleeds, Harris, B. and Krause, E., eds., Proceedings of the International Symposium on Impurity Control and Disposal in Hydrometallurgical Processes, Toronto, Ontario, Aug. 21–24, 1994).

iv) Cation-Exchange Unit (CEU)

In a variation of this invention, a cation exchange unit (CEU) is integrated with the process to further enhance the benefits afforded by its practice. The fixed-resin bed CEU is utilized to convert some of the sodium chlorate being fed to the chlorine dioxide generator to chloric acid. This has several advantages: feeding chloric acid instead of sodium chlorate reduces the sodium content in the generator and therefore increases it effective acidity as discussed above. This has the effect of increasing the rate of generation of chlorine dioxide in the generator. Alternatively, it is possible to operate the generator at a lower sulfuric acid concentration. This, in turn reduces the amount of sulfuric acid in the spent generator acid.

After treating the sodium chlorate generator feed solution, the cation-exchange resin of the CEU is in the sodium form. Purified sulfuric acid from the fixed-resin bed ARU is passed through the CEU and sodium ions are exchanged with hydrogen ions, thereby producing a sodium sulfate solution according to equation 16:

$$H_2SO_4 + 2\,R\text{—}SO_3Na \rightarrow Na_2SO_4 + 2\,R\text{—}SO_3H \quad (16)$$

where R—SO$_3$Na and R—SO$_3$H represent the cation-exchange resin in the sodium and hydrogen forms, respectively.

Since more than stoichiometric amounts of sulfuric acid may be needed to regenerate the cation exchange resin, the sodium sulfate spent regenerant solution may contain appreciable quantities of residual sulfuric acid.

The resin is converted back to the sodium form when a sodium chlorate solution is passed through it as shown in equation 17:

$$NaClO_3 + R\text{—}SO_3H \rightarrow HClO_3 + R\text{—}SO_3Na \quad (17)$$

Since more than stoichiometric amounts of sodium chlorate may be needed to convert the resin to the sodium form, the chloric acid product may contain appreciable quantities of sodium chlorate.

When the acid obtained from the fixed-resin bed ARU is used to regenerate the fixed-resin bed CEU used in the conversion of sodium chlorate to chloric acid, then the costs associated with the regeneration of the latter fixed-resin bed are reduced or eliminated; this is one of the major weaknesses of the prior art where cation exchange has been employed to produce chloric acid. Another weakness of the prior art is the use of conventional cation-exchange technology which employs very long cycle times. These long cycle times allow for the resin to be attacked by the chloric acid solution thereby leading to short resin lives. By using, in this invention, a commercially available Recoflo cation-exchange system known as the DCU (Eco-Tec Inc., Pickering, Ontario, Canada) which employs short cycle times and frequent resin wash steps, resin life can be prolonged significantly.

In order to further minimize the consumption of sulfuric acid, the fixed-resin bed CEU can be used in combination with salt-splitting technologies such as electrolysis or bipolar membrane electrodialysis (BME). In this case, the sodium sulfate produced from the regeneration of the CEU fixed-resin bed is split into sodium hydroxide, which goes to bleaching, and into sulfuric acid which is used to regenerate the CEU fixed-resin bed. On a net basis, it is thus possible to split sodium chlorate into sodium hydroxide and chloric acid thus reducing the sulfuric acid requirements of the chlorine dioxide generator and the sodium sulfate/sulfuric acid by-product (spent acid). Since the salt-splitting system will be operating with relatively inert chemicals, the life of the membranes in such a system is expected to be very long as compared to the case in which sodium chlorate is directly fed to the salt-splitting system; in the latter case, chloric acid and/or chlorine dioxide and chlorine are known to attack the membranes thereby decreasing their useful life.

v) Subatmospheric chlorine dioxide generators

In another variation of this invention, sodium sesquisulfate from subatmospheric chlorine dioxide generators is dissolved in water or a sulfuric acid-containing solution and subsequently separated into a de-acidified sodium sulfate stream that can be returned to the kraft recovery cycle and a purified sulfuric acid stream of sufficiently high concentration to be returned to the chlorine dioxide generator.

In this case, a slurry of sodium acid sulfate salt is produced as a result of reaction (1). This slurry is withdrawn and passed to a solid/liquid separation device such as a rotary drum vacuum filter. The acid filtrate is returned to the generator while the cake recovered from this filter is conveyed to a dissolving tank equipped with a mixer and heater to facilitate dissolution of the salt in the solution contained therein. Residual chlorate, chlorine dioxide and chlorine values are destroyed using a suitable reducing agent as described above in the case of atmospheric generators. The treated solution is then fed to a fixed resin bed ARU or any other acid separation system (e.g. diffusion dialysis, electrodialysis or nanofiltration). The de-acidified sodium sulfate solution is recycled to the kraft recovery cycle, (either the black or green liquor) for sodium and sulphur make-up. A portion of the purified acid withdrawn from the fixed-resin bed ARU or any other acid separation system is recycled to the dissolving tank and used for the dissolution of sodium sesquisulfate. A second portion of the purified acid product is utilized for rinsing generator media from the filter cake on the vacuum filter and the remainder is recycled to the chlorine dioxide generator, at a sufficiently high concentration to minimize evaporation costs.

BRIEF DESCRIPTION OF THE DRAWINGS

FIG. 1 is a graph illustrating the effect on resin durability of treating the feed solution to the ARU.

FIG. 2 is a detailed schematic of the most basic embodiment of the invention that we call the generator acid purification (ie. GAP) system.

FIG. 3 is a simplified schematic illustrating the integration of the GAP system of the invention into pulp mill operations.

FIG. 4 illustrates another embodiment of the invention shown in FIG. 3 in which an evaporator is used to concentrate the purified sulfuric acid from the GAP system prior to its return to the chlorine dioxide generator.

FIG. 5 illustrates another embodiment of the invention in which the purified sulfuric acid, from the GAP system is used to regenerate a cation-exchange unit (CEU) used to convert sodium chlorate to a sodium chlorate/chloric acid mixture.

FIG. 6 illustrates a modification of the process shown in FIG. 5 in which the sodium sulfate regenerant stream from the CEU is fed to an ARU to remove most of its sulfuric acid content.

FIG. 7 illustrates a further modification of FIG. 5 or FIG. 6 in which the sodium sulfate regenerant stream from the CEU is fed to a salt-splitting system which splits sodium sulfate into sodium hydroxide which goes to bleaching and into sulfuric acid which is used to regenerate the CEU.

DESCRIPTION OF PREFERRED EMBODIMENTS WITH REFERENCE TO THE DRAWINGS

Figure 1:
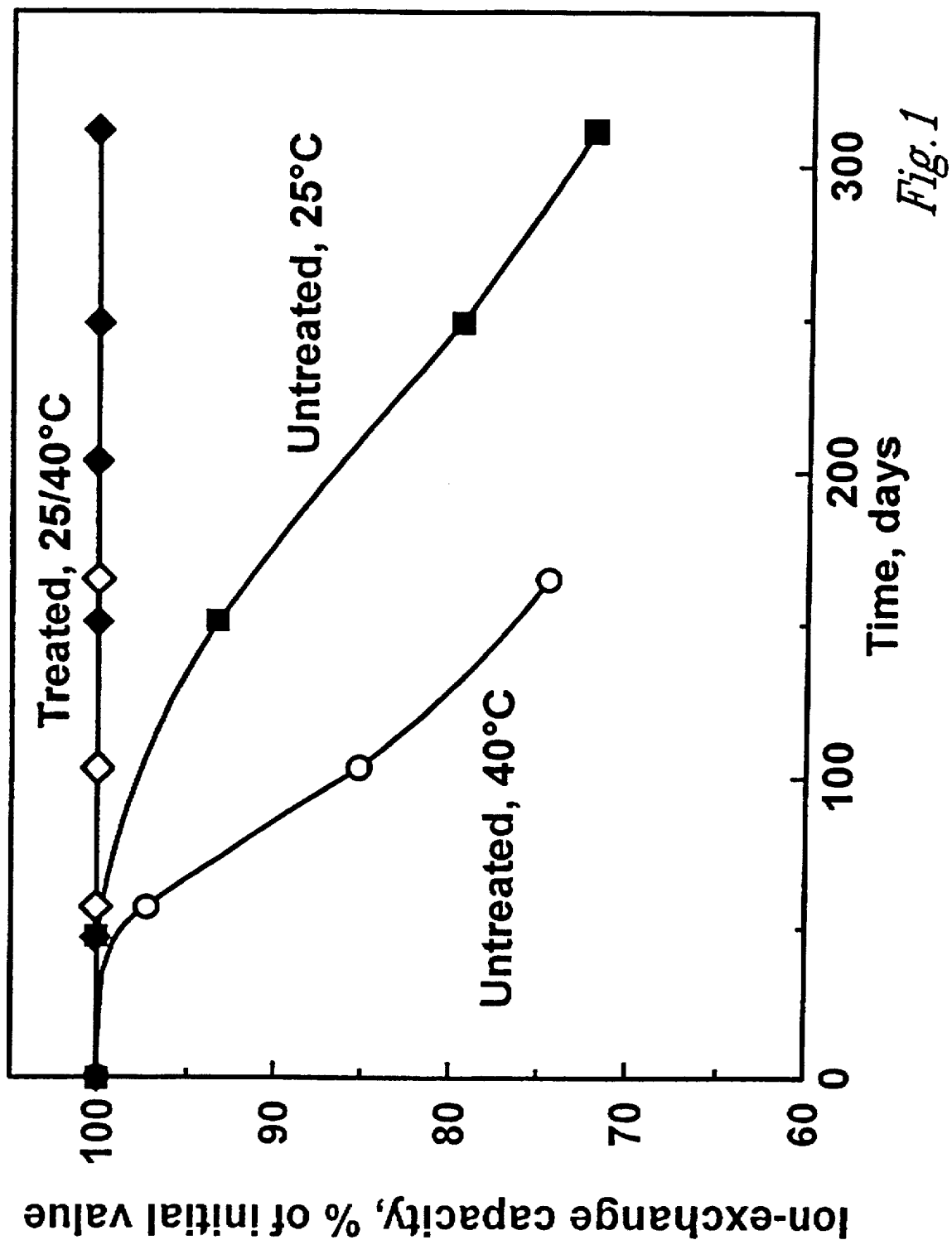
FIGS. 1 to 7 apply to both atmospheric and subatmospheric chlorine dioxide generators whereas FIGS. 8–10 specifically apply to subatmospheric chlorine dioxide generators.

FIG. 1 is a graph illustrating the effect of treating the feed solution to the fixed-resin bed ARU on resin durability. To address concern over resin durability, two laboratory tests were performed. The tests were conducted in brown bottles kept at room temperature at all times. In the first test, the ARU resin was exposed to untreated spent acid from the mill. In the second test, the mill spent acid was treated with sodium sulphite to destroy residual levels of chlorate, chlorine dioxide and chlorine. The amount of sodium sulphite used in preparing the treated solution for the durability studies was 1.1× the required stoichiometric amount and the sodium chlorate content was completely converted to sodium chloride. The solution was then purged by air to remove any dissolved gases (e.g. $ClO_2$, $Cl_2$) that may have been formed, before being used for the durability test. Moisture content, and the total ion-exchange capacity were measured for resins exposed to both treated and untreated mill spent acid solutions at various time intervals. For the test conducted at room temperature, it appears that the moisture contents of both the resin exposed to treated solution and the resin exposed to untreated solution remained largely unchanged at 52%, suggesting that the degree of cross-linkage of the resins remained the same in both cases after 311 days of continuous exposure. In the case, however, of ion-exchange capacity, it appears that there was a 28% decline in the capacity of the resin exposed to untreated solution whereas the resin exposed to treated solution did not suffer any losses at all. For the test conducted at 40° C., the temperature of the effluent of modified Mathieson chlorine dioxide generators, the moisture content of both the resin exposed to untreated solution and the resin exposed to treated solution remained largely unchanged as was the case at room temperature. The ion-exchange capacity of the resin exposed to untreated solution, however, declined by 25.3% over 165 days. The ion-exchange capacity of the resin exposed to treated solution did not suffer any losses at all over the same time period. It should mentioned here that these tests represent a worst-case scenario since during normal operation the resin is exposed to the feed solution for only 2.5 minutes of the 5-min operating cycle, whereas, during the remaining 2.5 minutes, the resin is washed with water. Based on these results, we decided to incorporate a spent acid treatment step as part of the GAP system.

Figure 2:
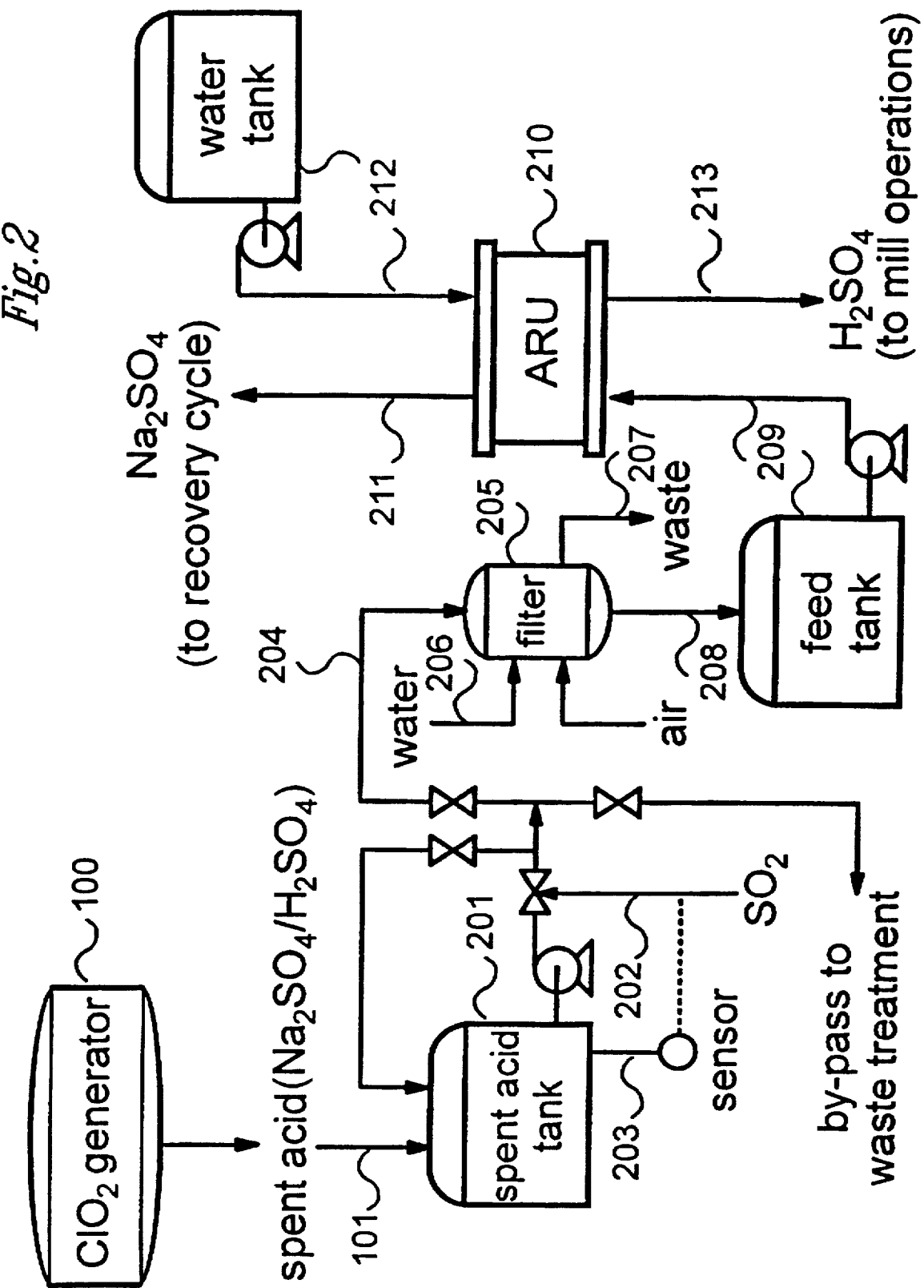

FIG. 2 is a detailed schematic of the GAP system of the invention. As shown in this FIG., spent acid, 101 from a chlorine dioxide generator, 100 is directed to the spent acid tank, 201. In case the sodium sulfate is not fully dissolved, this is accomplished in this tank through the addition of water. Sulphur dioxide, 202 (or sodium sulphite or any other suitable reducing agent) is then introduced into the spent acid storage tank to destroy the residual sodium chlorate, chlorine dioxide and chlorine. The progress of this reaction is monitored through an ORP sensor, 203. The treated solution, 204 is filtered using a multi-media filter, 205 to remove any suspended solids that might be present. The filter is periodically washed with water, 206 to produce a waste stream, 207. The filtered solution, 208 is directed to a feed tank, 209 and from there it is fed to a fixed-resin bed ARU, 210 in which the sulfuric acid is sorbed by the resin thus producing a de-acidified sodium sulfate solution, 211 which is directed to the recovery cycle for sodium and sulphur make-up. Water, 212 is then delivered to the ARU from a water supply tank, 212 to produce a purified sulfuric acid product, 213 which is directed to any one or more of several mill operations.

Figure 3:
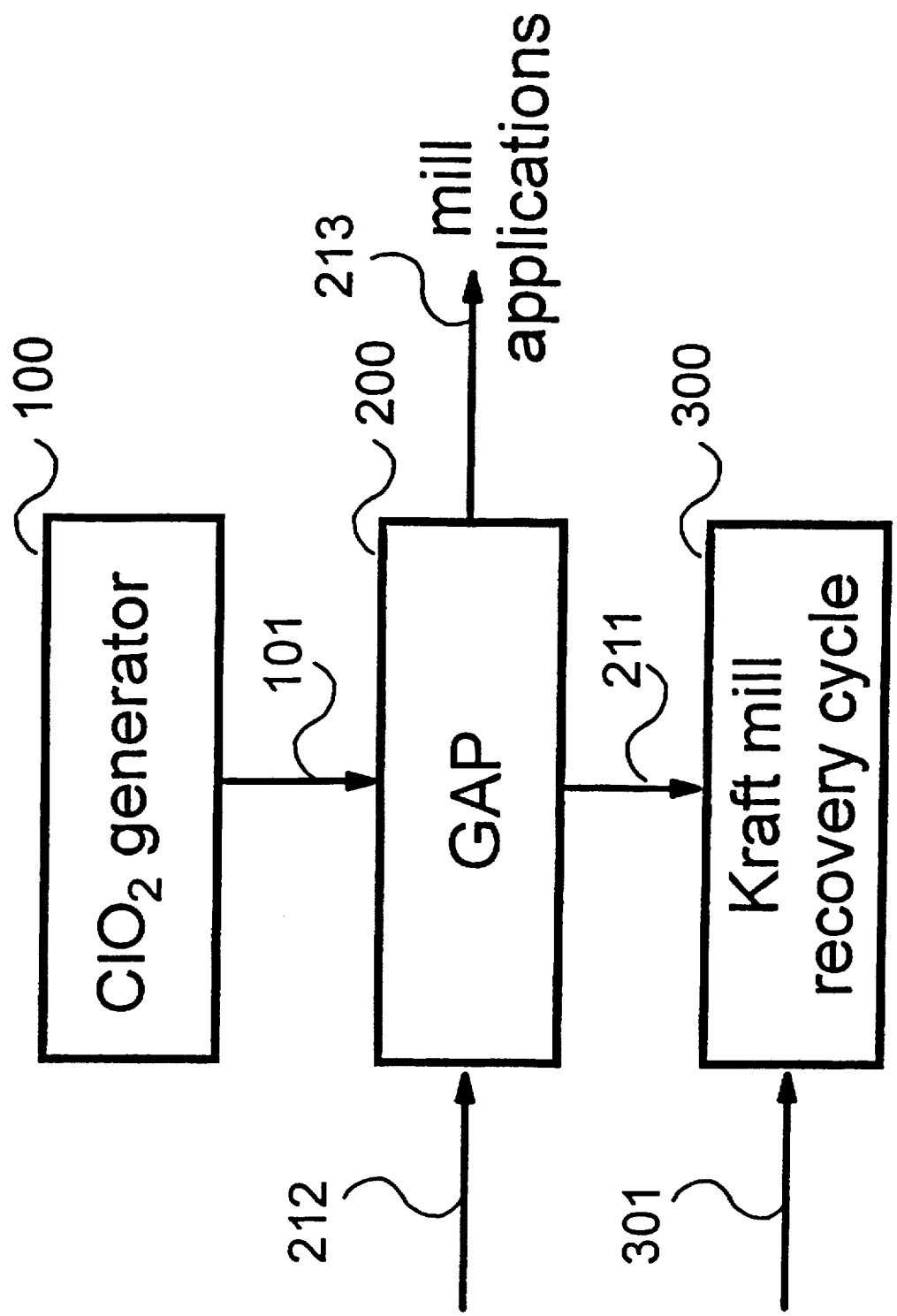

FIG. 3 is a simplified schematic illustrating the integration of the basic embodiment of the invention, the GAP system of FIG. 2, into pulp mill operations. As shown in this figure, spent acid, 101 from a chlorine dioxide generator, 100 is fed to the GAP system, 200 which removes sulfuric acid from this solution thereby producing a de-acidified sodium sulfate solution, 211 which is directed to the recovery cycle, 300 (either the black or green liquor) for sodium and sulphur make-up. Because this solution is de-acidified, the caustic make-up, 301 to the recovery cycle (white liquor) is expected to be reduced significantly. Fresh water, 212 is used to wash off the ARU resin bed of the GAP system a purified sulfuric acid product, 213 which is directed to several mill operations including: brownstock acidification for pitch control, pH adjustment prior to bleaching, acidulation of tall oils, regeneration of the ion-exchange columns used in the treatment of boiler feed water, dilution of sodium chlorate prior to introduction into the chlorine dioxide generator and removal of non-process metals prior to peroxygen bleaching stages.

Figure 4:
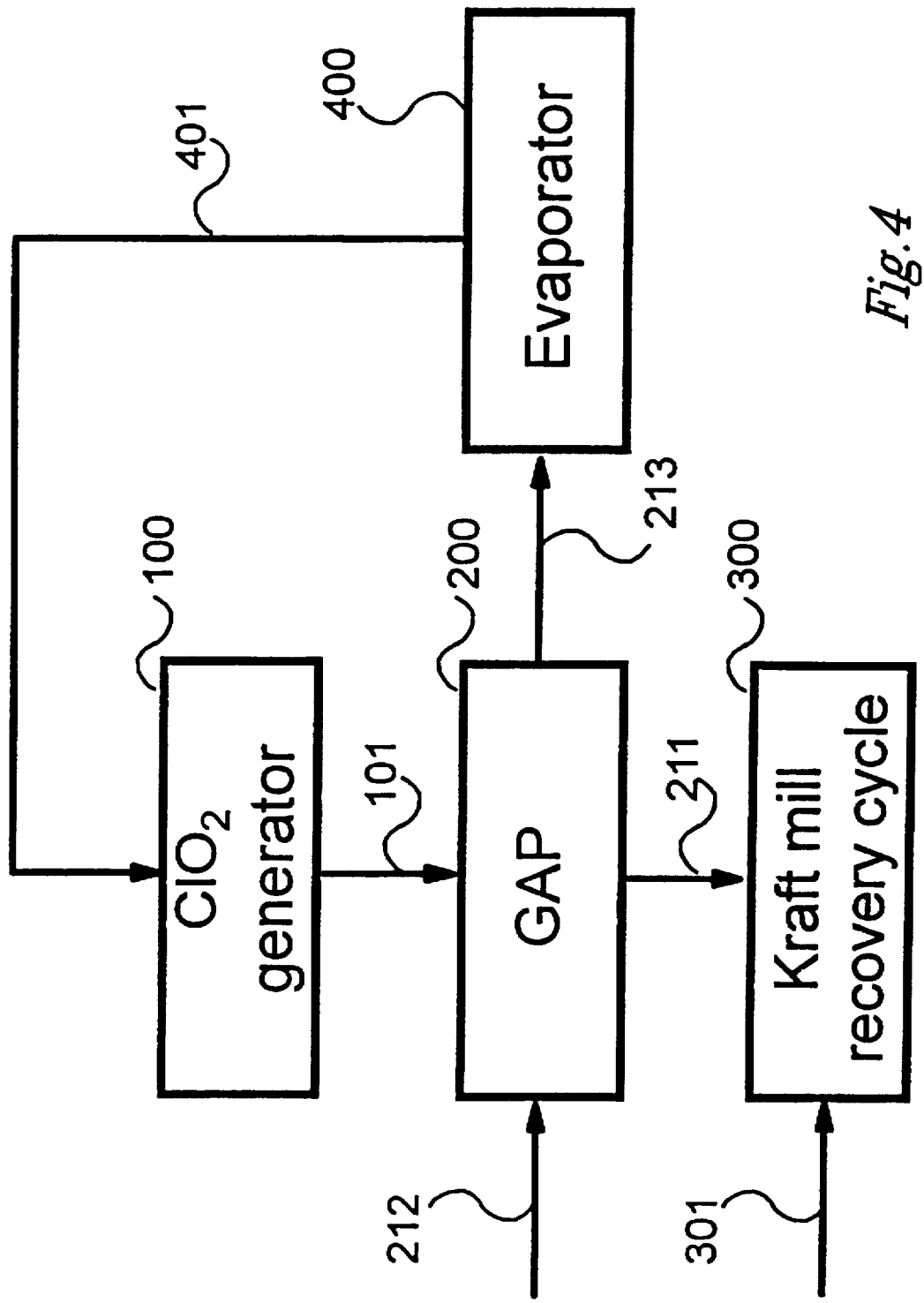

FIG. 4 illustrates a modification of the process shown in FIG. 3 in which the purified sulfuric acid, 213 from the GAP system, 200 is directed to a vacuum evaporator, 400 which is used to produce a concentrated sulfuric acid solution, which is recycled to the chlorine dioxide generator.

Figure 5:
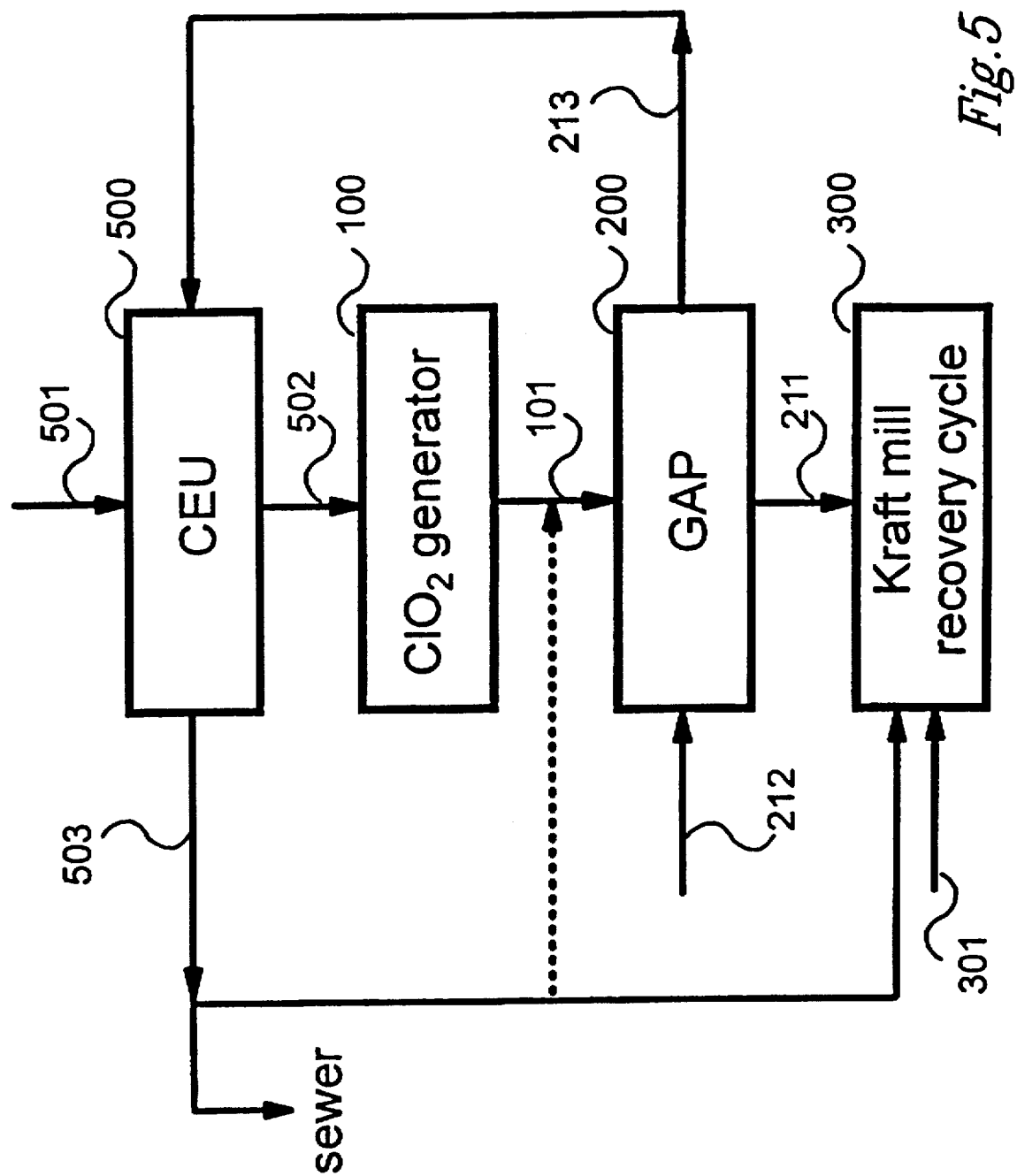

FIG. 5 illustrates a second modification of the process shown in FIG. 3 in which the purified sulfuric acid, 213 is used to regenerate a cation-exchange unit (CEU), 500 used to convert sodium chlorate to a sodium chlorate/chloric acid mixture, 502 which is fed to the chlorine dioxide generator, 100 in place of sodium chlorate and sulfuric acid. The partially de-acidified sodium sulfate product, 503 of the CEU resin bed regeneration step is returned to the recovery cycle, 300 as sodium and sulphur make-up thereby decreasing the caustic make-up, 301 to the recovery cycle. Alternatively, since this stream contains some residual sulfuric acid it may be mixed with spent acid, 101 prior to treatment with the GAP system.

Figure 6:
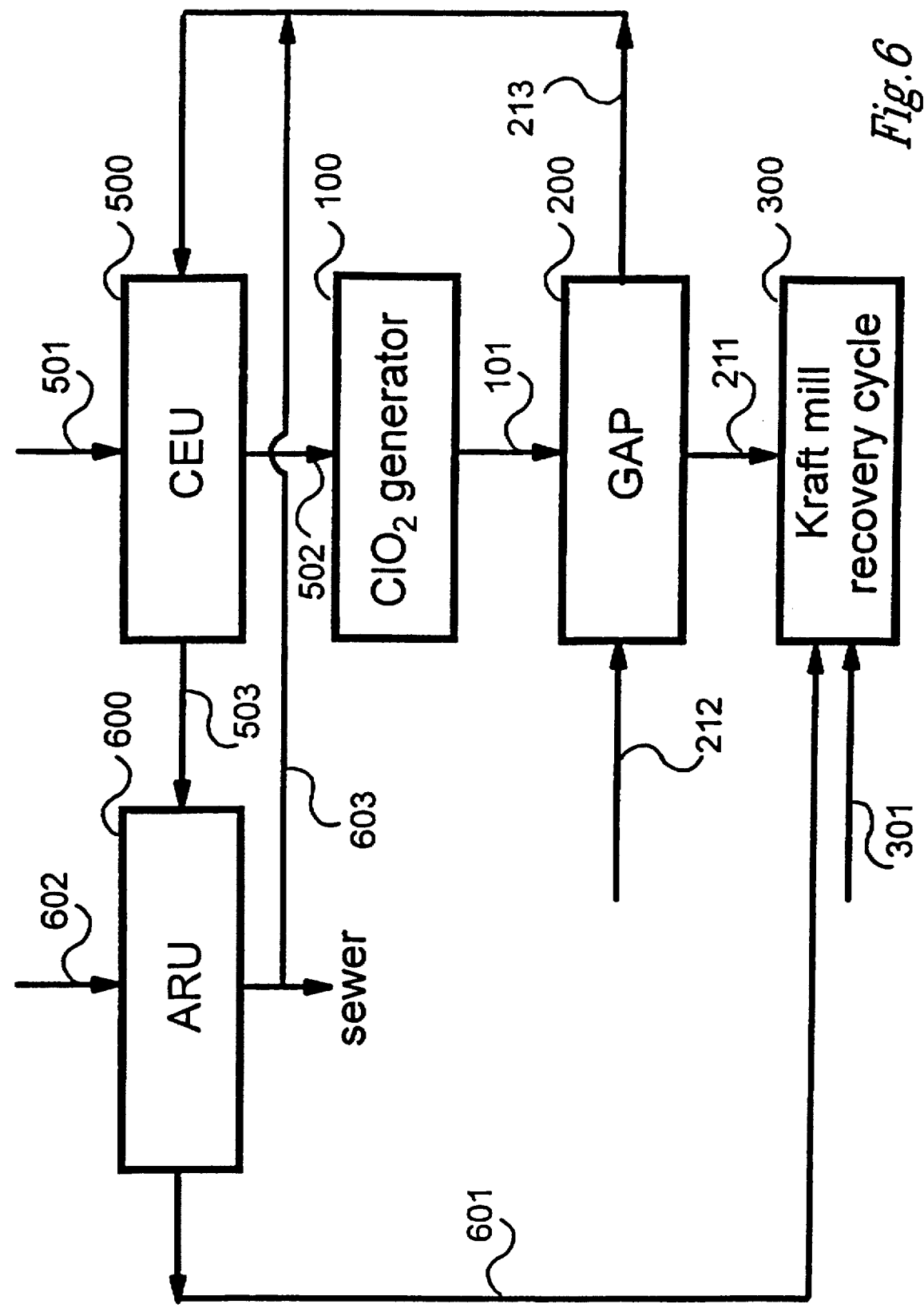

FIG. 6 illustrates a modification of the process shown in FIG. 5 in which the sodium sulfate regenerant stream, 503 from the CEU, 500 is fed to an ARU, 600 in order to remove most of its sulfuric acid content thereby producing a de-acidified sodium sulfate solution, 601 which is returned to the recovery cycle, 300. Since this stream is de-acidified it does not destroy alkalinity in pulp mill liquors (black or green liquor thereby decreasing the caustic make-up, 301 to the recovery cycle (into the white liquor). Fresh water, 602 is used to wash off the acid from the ARU producing a sulfuric acid stream, 603 which is mixed with the purified acid, 203 from the GAP system, 200 or sewered.

Figure 7:
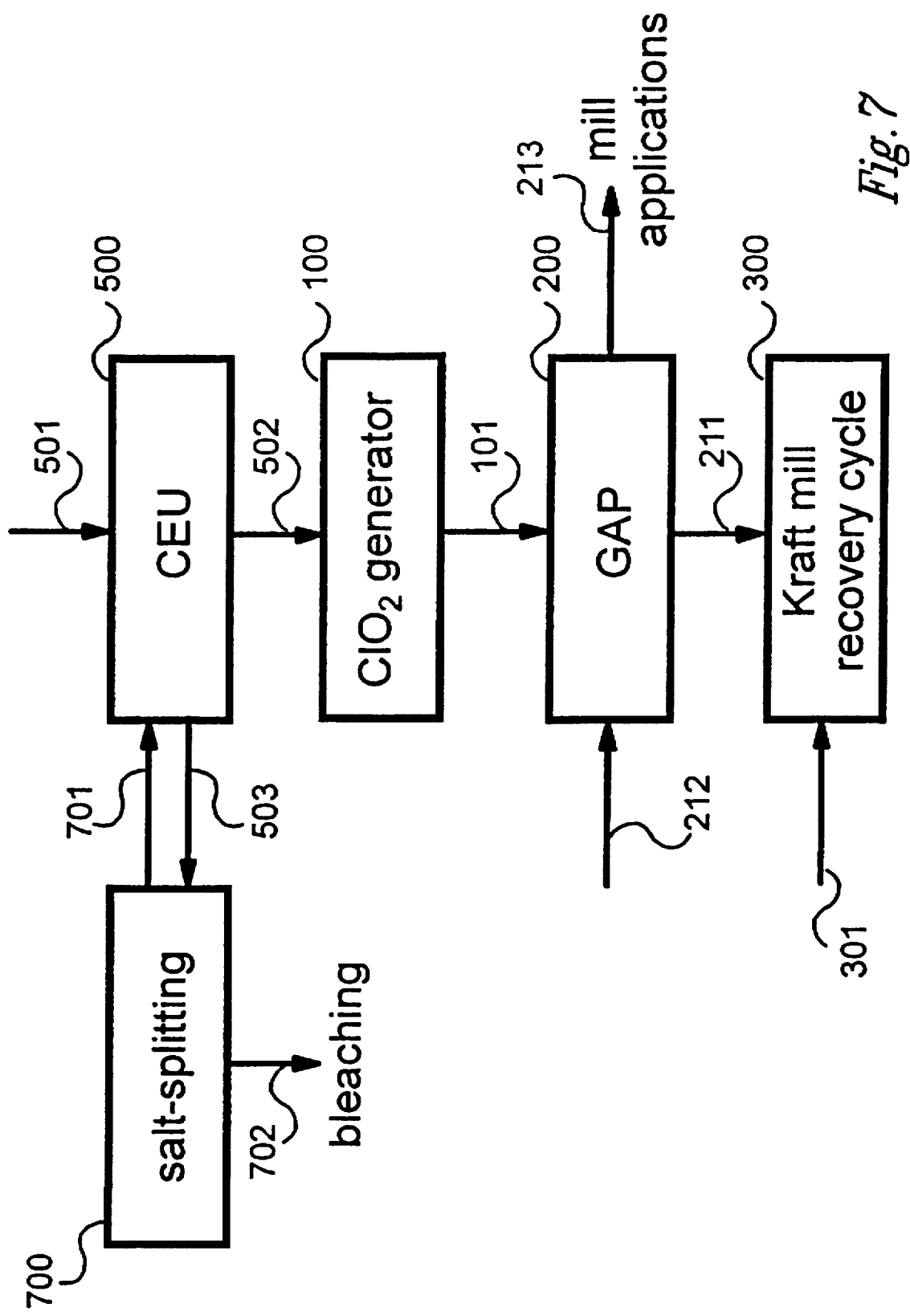

FIG. 7 illustrates a further modification of FIG. 5 in which the sodium sulfate regenerant stream from the CEU, 503 is fed to a salt-splitting system, 700 which splits sodium sulfate into sodium hydroxide, 702 which goes to bleaching and into sulfuric acid, 701 which is used to regenerate the CEU, 500. The salt-splitting system could be an electrolysis system or a bipolar membrane electrodialysis system splitting any salt into its component acid and base.

Figure 8:
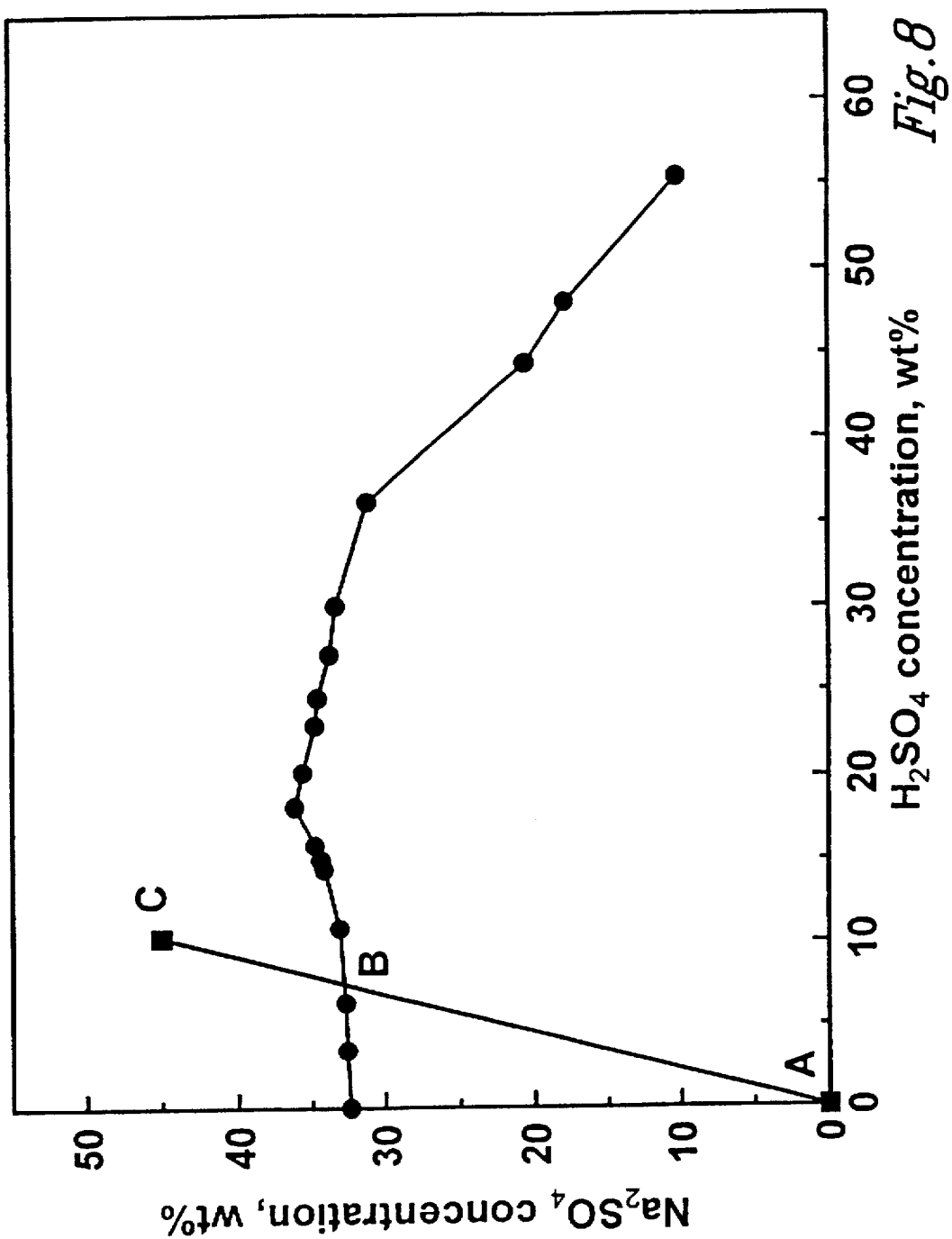
FIG. 8 is a graph showing the solubility of sodium sulfate in an aqueous solution of sulfuric acid at various concentrations of sulfuric acid at a temperature of 46° C.
Figure 9:
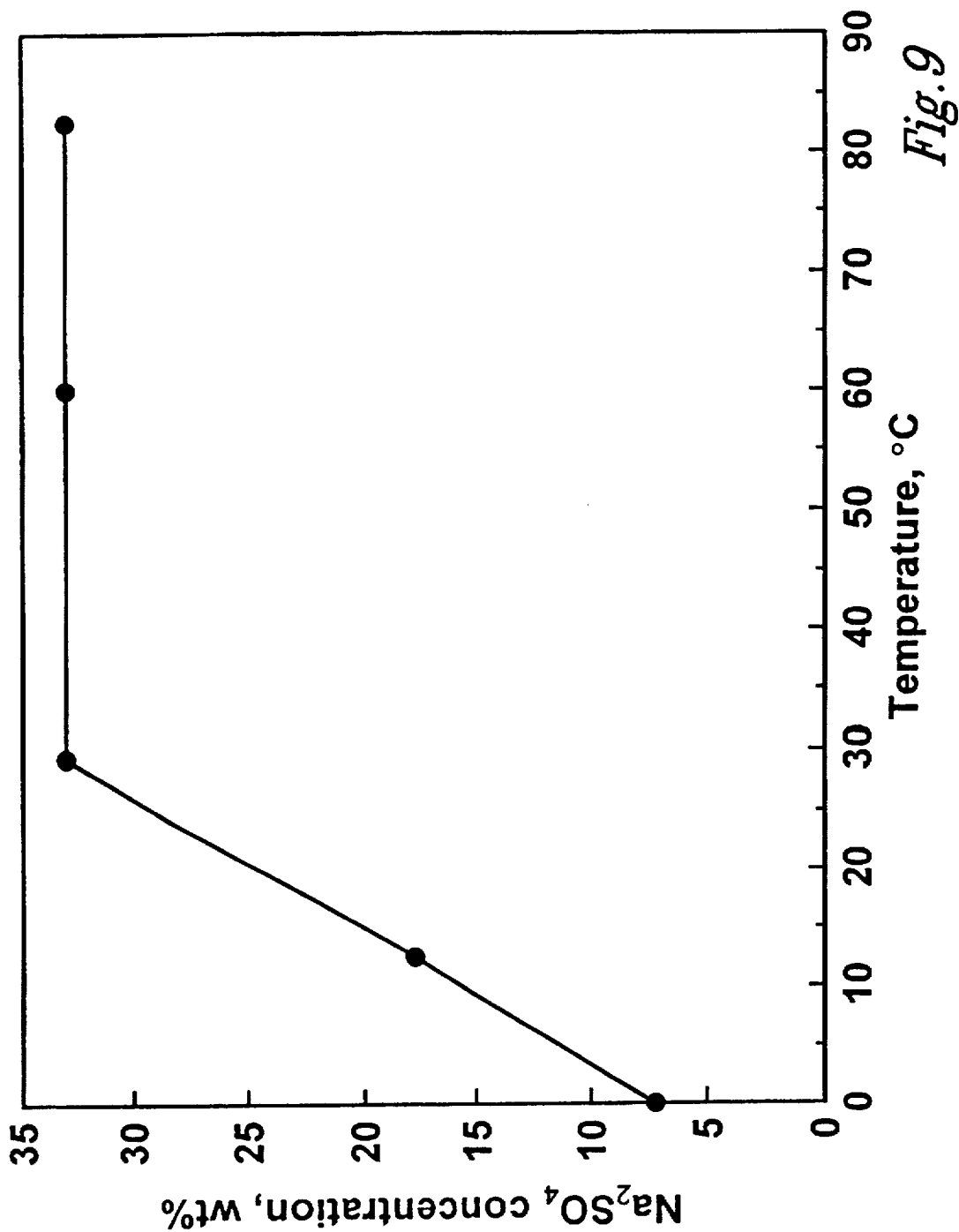
FIG. 9 is a graph showing the solubility of sodium sulfate in water (i.e. with no sulfuric acid).
Figure 10:
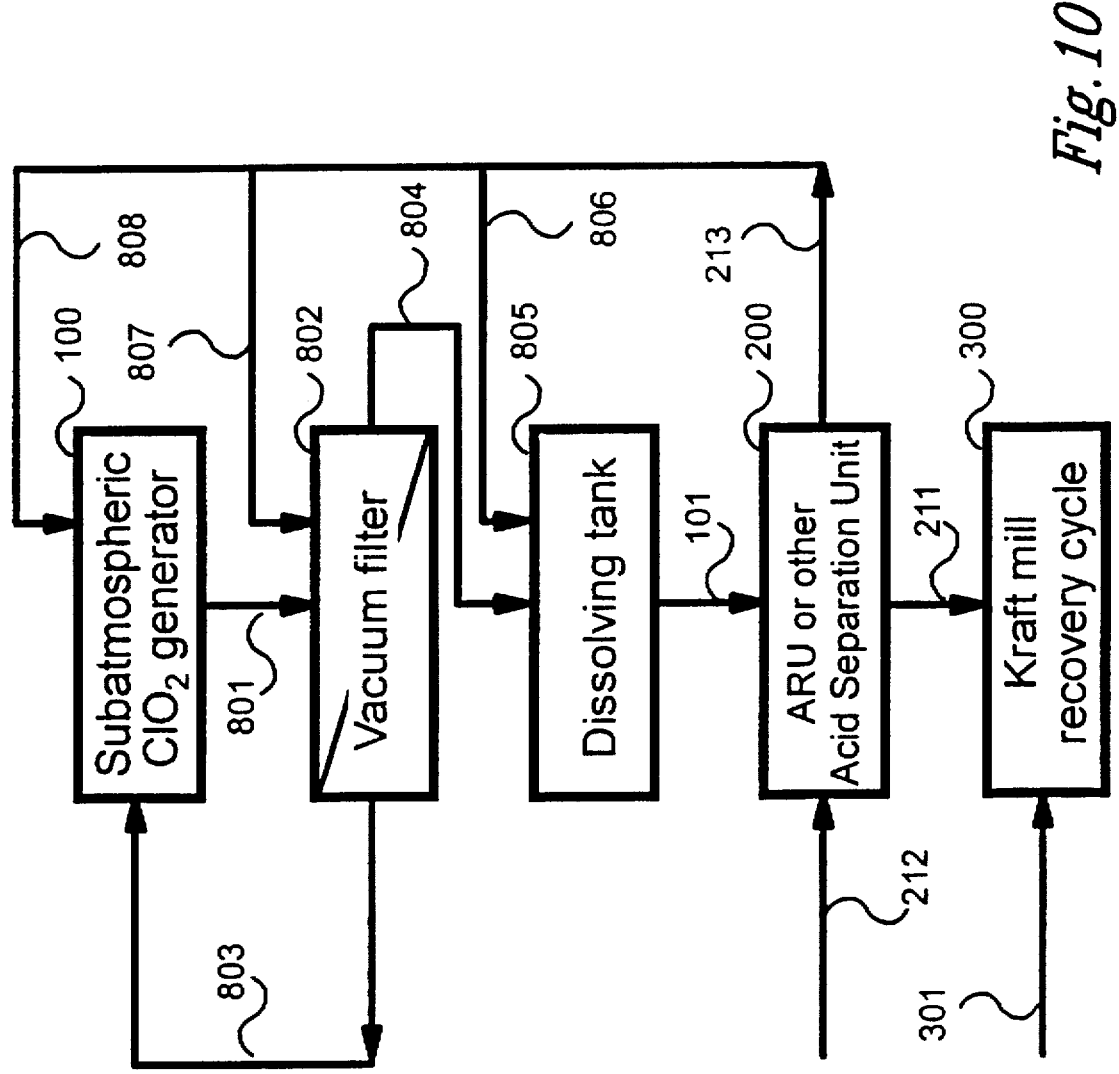
FIG. 10 is another embodiment of the invention which illustrates how sodium sesquisulfate from subatmospheric chlorine dioxide generators can be dissolved in a sulfuric acid-containing solution and subsequently separated into a de-acidified sodium sulfate stream that can be returned to the kraft recovery cycle and a purified sulfuric acid stream sufficiently concentrated to be returned to the chlorine dioxide generator.

FIGS. 8, 9 and 10 specifically apply to subatmospheric chlorine dioxide generators which produce solid sodium sesquisulfate as a by-product of the chlorine dioxide process. In this case, a fixed-resin bed ARU or any other acid separation system (e.g. diffusion dialysis, electrodialysis, nanofiltration) can be employed with this invention. For simplicity, discussion will be largely restricted to the fixed-resin bed ARU.

FIG. 8 shows the solubility of sodium sulfate at different sulfuric acid concentrations at a temperature of 46° C. Line AC represents the ratio of sodium sulfate to sulfuric acid present in sodium sesquisulfate, which corresponds to a sulfuric acid content of approximately 18% of the total. The point B at which line AC crosses the solubility line represents the maximum solubility of sodium sesquisulfate that can be achieved by dissolution in water. This will produce a solution containing a sulfuric acid concentration of about 7% and a sodium sulfate concentration of about 32%. If this solution were fed to a fixed-resin bed ARU or any other acid separation system (e.g. diffusion dialysis, electrodialysis, nanofiltration), the sulfuric acid would be removed from the feed solution, thus producing a de-acidified sodium sulfate solution. The maximum concentration of sulfuric acid that can be withdrawn from the fixed resin bed ARU or most other acid separation systems would be that of the feed i.e. 7%. In practice, the actual acid concentration would be somewhat less, typically 5–6%, due to loss of acid values to the de-acidified salt by-product solution.

FIG. 9, shows the solubility of sodium sulfate in aqueous solutions as a function of temperature. The solubility of sodium sulfate is very temperature dependent below a temperature of about 30° C. In order to maximize the solubility of sodium sesquisulfate and to maximize the concentration of sulfuric acid produced by the invention, the temperature of the solution used to dissolve the saltcake should be greater than 30° C. To avoid crystallization of sodium sulfate in the system, the water employed for elution should also be heated to greater than 30° C.

FIG. 10 is another embodiment of the invention which illustrates how sodium sesquisulfate from subatmospheric chlorine dioxide generators can be separated into a de-acidified sodium sulfate stream that can be returned to the kraft recovery cycle and a purified sulfuric acid stream of sufficiently high concentration to be returned to the chlorine dioxide generator. In such a generator, 100, a slurry of sodium acid sulfate salt, 801 is produced as a result of reaction 1. This slurry is withdrawn and passed to a solid/liquid separation device, 802 such as a rotary drum vacuum filter. The acid filtrate, 803, is returned to the generator. The cake recovered from this filter is conveyed via connecting means, 804 to a dissolving tank, 805 equipped with a mixer and heater (not shown) to facilitate dissolution of the salt in the solution contained therein. In this case, the destruction of residual chlorate, chlorine dioxide and chlorine values can be carried out in the dissolving tank. The treated solution is fed to a fixed-resin bed ARU or any other acid separation system (e.g. diffusion dialysis, electrodialysis, nanofiltration). The sulfuric acid is thus removed from the feed solution yielding a de-acidified sodium sulfate solution, 211, which can be recycled to the kraft recovery cycle, 300 (either the black or green liquor) for sodium and sulphur make-up. Because this solution is de-acidified, the caustic make-up, 301 to the recovery cycle (white liquor) is expected to be reduced significantly. If a fixed-resin bed ARU is employed, fresh water, 212 is used to wash off the ARU resin bed a purified sulfuric acid product, 213; alternatively, such an acid product can be withdrawn from any other acid separation system. A portion of the purified acid product, 213, is recycled to the dissolving tank, 805 via connecting means, 806. A second portion of the purified acid product, 807 is utilized for rinsing generator media from the filter cake on the vacuum filter, 802 and the remainder, 808 is recycled to the chlorine dioxide generator, 100.

It can be noted from FIG. 8 that the solubility of sodium sulfate is largely independent of sulfuric acid concentration up to an acid concentration of about 30%, after which point it begins to be adversely affected by increasing acid concentration. According to the present invention, the sodium acid sulfate salt is not dissolved in pure water. Instead, the purified sulfuric acid product that is withdrawn from the acid separation system is used to dissolve the acid salt. The process can be operated in either of two basic manners:

If operated in the batch mode, a batch of saturated sodium sesquisulfate solution is first prepared by adding the salt to water until no more solid will dissolve. This solution is then fed to a fixed-resin bed ARU or any other acid separation system. The de-acidified sodium sulfate solution is collected. The purified sulfuric acid product with a reduced concentration of sodium sulfate produced by the acid separation system is also collected. Additional sodium sesquisulfate can then be dissolved in the acid product. The resulting solution, now fortified with more sodium sulfate and sulfuric acid is fed again to the acid separation system. The de-acidified salt is collected, while the purified acid product is collected and then used to dissolve more sodium sesquisulfate, which further increases the sulfuric acid concentration in the solution. The process of dissolving sodium sesquisulfate in the acid product and feeding it again to the acid separation system is repeated several times until the desired acid strength is reached. At this point the purified acid can be recycled back to the chlorine dioxide generator. Another batch can then be similarly processed.

The process can be operated in a continuous fashion as well. This is generally the preferred mode of operation because control is simpler, although the two modes of operation are effectively the same. Where the claims of the invention refer to continuous operation, the batch operation is implicitly included. In this case, a portion of the purified acid product withdrawn from the acid separation system is recycled back to the dissolving tank. Sufficient solid sodium sesquisulfate is added to the solution in the dissolving tank to maintain a solution which approaches saturation. The remainder of the purified acid product is collected for recycle back to the chlorine dioxide generator or use elsewhere in the mill. The relative volume of acid product that is recycled for dissolution of more salt, to that which is collected for return to the generator, will determine the acid concentration. Under optimal conditions, the requirements for solvent to dissolve the sodium sesquisulfate in the dissolution tank will be entirely met by the recycle of sulfuric acid obtained from the acid separation unit. No fresh water will be added directly to the dissolution tank.

In case a fixed-resin bed ARU is used, the concentration of residual acid present in the de-acidified sodium sulfate solution is very dependent on the amount of water employed to elute the acid from the resin bed. If a small amount of water is used, the acid concentration in the salt solution will be high, thereby reducing the amount of acid which is sorbed by the resin bed and available for recovery. On the other hand, if a large amount of water is used, this will tend to reduce the concentration of the recovered acid product which is contrary to the prime objective of this invention.

As mentioned before, organic ion exchangers such as those employed in the fixed-resin bed ARU of this invention are subject to oxidation by oxidizers such as sodium chlorate. For this reason it is not feasible to employ an ARU to treat the chlorine dioxide generator effluent directly to remove dissolved sodium sulfate. In the case of subatmospheric chlorine dioxide generators, crystallization of the sodium sulfate provides an important benefit in that it leaves most of the sodium chlorate behind in the mother liquor so that when the sodium acid sulfate salt is re-dissolved, the resulting solution that is treated with the ARU contains only a small quantity of chlorate. As previously discussed, this small amount of residual chlorate can be economically reduced, if necessary, with a reducing agent such as sulfur dioxide, methanol or hydrogen peroxide in the dissolving tank of this invention.

According to prior art, in order to reduce the amount of sodium chlorate which is lost with the saltcake, the saltcake is normally washed with fresh water, the washings being recycled back to the generator. This recycled water of course imposes an evaporation load on the generator. Unfortunately, a portion of the sodium sulfate cake is dissolved by this washing, thereby increasing the dead load of sodium sulfate which must ultimately be recrystallized. In a preferred embodiment of this invention, the saltcake is washed with sulfuric acid eluted from the fixed-resin bed ARU or withdrawn from any other acid separation system, instead of fresh water. The presence of sulfuric acid in this washing solution will somewhat reduce the solubility of sodium sulfate in the washings and thereby reduce the sodium sulfate dead load. By doing this, the evaporation load on the generator can be decreased. Alternatively, in case a fixed-resin bed ARU is used, additional elution water can be utilized by the ARU in each cycle which will reduce the concentration of sulfuric acid in the de-acidified by-product thereby increasing the acid recovery efficiency of the process. The acid left in the saltcake after washing in this manner is not lost since it is recovered when the saltcake is redissolved in the dissolving tank.

EXAMPLE 1

In this example, chlorine dioxide generator spent acid was processed through all steps shown in FIG. 2 of the invention. The spent acid used was supplied by an eastern Canadian mill (mill A) with a modified Mathieson chlorine dioxide generator which is an atmospheric type of generator. The modified Mathieson generator consists of two reactors, referred to as the primary (P) and secondary (S) generators followed by a stripper for the removal of residual chlorine dioxide and chlorine from the generator spent acid. Three samples from the secondary generator and one from the primary were obtained and analyzed at three different times (A, B and C); the mill provided the analyses of their spent acid for the primary and the secondary generators at time D. These data are shown in Table 1.

TABLE 1

Comparison of primary (P) and secondary (S) generator spent acid at Mill A.

| Sample | $NaClO_3$, g/L | NaCl, g/L | $H_2SO_4$, g/L | $Na_2SO_4$, g/L | $ClO_2$, g/L | Fe, ppm | Cr, ppm |
|---|---|---|---|---|---|---|---|
| A, S | N.D. | N.D. | 460 | 440 | 1.5 | 10 | 720 |
| B, S | 5.3 | 0.040 | 440 | 300 | — | 13 | — |
| D, P | 18 | 3.0 | 470 | 400 | 0.50 | — | 970 |
| D, S | 2.3 | 4.6 | 480 | 420 | 0.90 | — | — |
| C, S | 1.0 | 0.030 | 480 | 440 | 1.4 | 66 | 760 |

The low level of chloride and chlorate in the spent acid received from the mill, is due to the continuing reaction of residual chlorate with chloride at high acidity producing chlorine dioxide and chlorine. Since it takes a few days to receive the spent acid sample from the mill, the measured levels of the remaining sodium chloride and sodium chlorate are relatively low.

In a first step, sodium sulphite or sulphur dioxide can be used to destroy the residual chlorate, chlorine dioxide and chlorine in the spent acid; the completion of the reaction was monitored by an ORP sensor. Table 2 demonstrates that chlorate can be destroyed with sodium sulphite in a short period of time (<2 min); in this experiment 1.1× the required stoichiometric amount of sodium sulphite was used.

TABLE 2

Destruction of chlorate in generator spent acid using sodium sulphite.

| | $NaClO_3$ concentration, M | NaCl concentration, M |
|---|---|---|
| Before treatment | 0.050 | not detected |
| After treatment | 0.0011 | 0.050 |

Alternatively, sulphur dioxide was sparged through a 2-μm filter into a 50-cm column of spent acid at 0.83 L/min. The amount of sulphur dioxide used was 1.22× the required stoichiometric amount. An ORP sensor was used to control the amount of sulphur dioxide added. The initial ORP reading for the mill spent acid solution was 1040 mV (Pt. vs Ag/AgCl) and, the final reading was 500 mV, at which point no chlorate was detected in the solution. The sodium chloride residue was about half the amount expected from the complete conversion of sodium chlorate, indicating that some chlorine dioxide and chlorine were also formed. As shown in Table 3, within twenty minutes from the initiation of the reaction all of the residual chlorate was destroyed and no detectable amounts of chlorine dioxide or chlorine were observed.

TABLE 3

Destruction of chlorate in generator spent acid using sulphur dioxide.

| Time, min. | $SO_2$ added, mol | Residual $NaClO_3$ concentration M | Residual $NaClO_3$ concentration mol | Residual NaCl concentration M | $SO_2$ to $NaClO_3$, molar ratio |
|---|---|---|---|---|---|
| 0 | 0 | 0.055 | 0.21 | 0.0090 | — |
| 6.7 | 0.25 | 0.038 | 0.068 | 0.071 | 3.6 |
| 16.5 | 0.61 | 0.015 | 0.058 | 0.085 | 3.9 |
| 20.0 | 0.74 | 0 | 0 | 0.11 | 3.4 |

In a second step, the treated solution was filtered to remove any suspended solids that might be present. The spent acid from Mill A was found to contain 0.0128 g/L of suspended solids (filtered through a 1.5 μm Whatman glass microfiber filter, type 934/AH).

In a third step, the treated spent acid from the second step was fed to an ARU. Tests were conducted using a commercially available ARU known as the APU (Eco-Tec, Inc., Pickering, Ontario, Canada). The pilot plant was equipped with a 5-cm diameter ×60 cm height fixed-resin bed. Extensive previous experience with this unit has shown that the results obtained can reliably predict operation in full-scale plants.

The APU can be operated under different conditions, separating acid from salt with varying degrees of efficiency. The most cost-effective operation for the mill occurs when the amount of acid in the by-product salt solution and the amount of salt in the product acid solution are minimized. If, however, the mill requirement for sodium sulfate is higher than the amount present in the spent acid, the operating conditions can be adjusted to leave behind more sulfuric acid in the product sodium sulfate stream, ultimately resulting in a larger amount of equivalent sodium sulfate saltcake in the recovery cycle.

Table 4 shows the net overall average throughput rates and concentrations of products obtained under a set of operating conditions, A, chosen to minimize the amount of acid in the salt by-product. This was accomplished by using a relatively large volume of water to elute the acid from the resin bed (5.9 L water/2.3 L feed=2.57). In this experiment, modified Mathieson chlorine dioxide generator spent acid solution (476 g/L $H_2SO_4$ and 414 g/L $Na_2SO_4$) was fed to the APU at a feed rate of 2.3 L/h and was separated into two streams: a sodium sulfate-rich byproduct stream (202 g/L $Na_2SO_4$ and 16 g/L $H_2SO_4$) produced at a rate of 4.0 L/h and a sulfuric acid-rich product stream (247 g/L $H_2SO_4$ and 32 g/L $Na_2SO_4$) produced at a rate of 4.2 L/h. Although the flow of each stream is intermittent, all flows are expressed as a net overall average.

TABLE 4

Throughput rates and composition of products for an APU run, A, in which the feed solution was treated spent acid from a modified Mathieson chlorine dioxide generator

| Fraction | Flow, L/h | $H_2SO_4$, g/L | $Na_2SO_4$, g/L | Cr, g/L | NaCl, g/L |
|---|---|---|---|---|---|
| Salt/Acid Feed | 2.3 | 476 | 414 | 0.894 | 13.3 |
| Salt by-product | 4.0 | 16 | 202 | 0.426 | 0.117 |
| Acid product | 4.2 | 247 | 32 | 0.047 | 6.61 |
| Water Feed | 6.3 | — | — | — | — |

Since the chromium in the feed solution is in the trivalent cation form, most of the chromium (92.5%) reports with the salt by-product in the form of chromium sulfate. Since the salt by-product is returned to the recovery cycle of the mill, the chromium is ultimately expected to be removed from the green liquor through the dregs. This means that mills with a high chromium content in their chlorine dioxide generator effluent, following the installation of a GAP system, will be able to avoid sewering it to the effluent treatment system and ultimately to the receiving waters. Instead, the chromium will end up in the mill dregs which are usually landfilled.

It has been found that under the conditions employed in this experiment, a much greater proportion of the chloride reports to the purified acid stream (98.3%) as compared to the de-acidified sodium sulfate stream (1.7%). As a result, the de-acidified sodium sulfate solution can be returned to the recovery cycle with no adverse consequences (e.g. corrosion and/or clogging of recovery boiler) due to chloride contamination. Moreover, if the purified acid is recycled back to the chlorine dioxide generator, the recovered chloride can take part in the generation of chlorine dioxide and improve the performance of the process.

Under a second set of operating conditions, B, a spent acid solution (445 g/L $H_2SO_4$ and 392 g/L $Na_2SO_4$) fed at 3.1 L/h was separated into a sodium sulfate-rich by-product stream (260 g/L $Na_2SO_4$ and 80 g/L $H_2SO_4$) produced at a rate of 5.1 L/h and a sulfuric acid-rich product stream (323 g/L $H_2SO_4$ and 22 g/L $Na_2SO_4$) produced at 3.2 L/h. The main difference in these two operating conditions is that in case B, less water was used to elute the acid from the resin (ie. 5.2 L/3.1 L feed=1.68) than in case A. This led to the formation of a more acidic sodium sulfate-rich byproduct solution and a more concentrated sulfuric acid-rich product.

TABLE 5

Throughput rates and composition of products for an APU run, B, in which the feed solution was spent acid from a modified Mathieson chlorine dioxide generator

| Fraction | Flow, L/h | $H_2SO_4$, g/L | $Na_2SO_4$, g/L |
|---|---|---|---|
| Salt/Acid Feed | 3.1 | 445 | 392 |
| Salt By-product | 5.1 | 80 | 260 |
| Acid Product | 3.2 | 323 | 22 |
| Fresh Water Feed | 5.1 | — | — |

EXAMPLE 2

Mill A of example 1 was evaluated as a candidate for the integration of the GAP system into pulp mill operations (FIG. 3). The mass balance data presented here are based on a 12 t/d chlorine dioxide production (50% chlorine dioxide substitution). The generator is operated at 40° C. and under a slight vacuum of 7.5-cm water. Chlorine dioxide is obtained as a solution of about 9.5 g/L in water.

A portion of spent acid from the chlorine dioxide generator is added to green liquor for sodium and sulphur make-up to the recovery cycle. The spent acid requirement is affected by sulphur losses from the flue gas scrubber and brownstock washing. The amount of spent acid to be added to the green liquor at any given time is determined on the basis of the sulphidity of the white liquor. If the sulphidity becomes too high, the flow of spent acid to green liquor is reduced. The average sulphidity for mill A is about 27% (based on total titratable alkali (TTA)), and it ranges from 20% to 30%. We obtained two samples of white liquor from the mill with sulphidities of 19.5% and 26.2% (Table 6).

TABLE 6

Composition of Mill A white liquor

| Sample | NaOH, g/L $Na_2O$ | $Na_2S$, g/L $Na_2O$ | NaOH + $Na_2CO_3$, g/L $Na_2O$ | TTA, g/L $Na_2O$ | Sulphidity, % |
|---|---|---|---|---|---|
| E | 72 | 22 | 92 | 110 | 20 |
| F | 72 | 31 | 88 | 120 | 26 |

The sample F has a higher sodium sulphide ($Na_2S$) and a lower caustic (NaOH+$Na_2CO_3$) content compared to the sample obtained in April 93. Mill A has the option of reducing its average sulphidity from 27% to a lower level (e.g. 25%), by adding less spent acid to green liquor. In such a case, the caustic saving resulting from the APU™ de-acidified sodium sulfate by-product would increase since less acid would need to be retained with the salt to satisfy the sulphur requirements of the recovery cycle. In addition, by having a smaller amount of sodium sulfate as dead load in the green liquor, the causticizers are expected to operate more efficiently leading to increased caustic levels in the white liquor.

The flow of spent acid to the green liquor tank at mill A is on the average, 1045 L/h and ranges from 318 to 1817 L/h. The total sodium sulfate demand in the recovery cycle, originating from sodium sulfate in the spent acid as well as sodium sulfate which is formed through reactions 6, 7 and 8, is on the average, 28 t/d and ranges from 12 to 48 t/d; this requires the addition of an average of 9.8 t/d (4.2 to 16.9 t/d) of sodium hydroxide to the white liquor to make up for the caustic values destroyed in the green liquor by the sulfuric acid component of the spent acid. The amount of spent acid going to the effluent treatment system ranges from 2.7 to 18.3 t/d.

At 12 t/d chlorine dioxide production, the spent acid flow rate from the chlorine dioxide generator is about 49,390 L/d (20.5 t/d of sodium sulfate and 23.5 t/d of sulfuric acid). This is based on a spent acid composition of 476 g/L sulfuric acid and 414 g/L sodium sulfate. If a GAP system is installed at mill A, which processes all of its spent acid, the mill will be in a position to save as much as 8.8 t/d of sodium hydroxide make-up to the white liquor and, in addition, produce 22.1 t/d of purified acid which can be used at various applications at the mill site. For example, mill A has the option of using 4 t/d of sulfuric acid in brownstock acidification. Moreover, the GAP system will be producing 19.6 t/d of de-acidified sodium sulfate which can be returned to the recovery cycle. Mill A would have to purchase 8.4 t/d of sodium sulfate in order to come up with the 28 t/d of sodium sulfate that is needed for sodium and sulphur make-up in the recovery cycle. Alternatively, it has the option of operating at lower sulphidity levels in the recovery cycle, in which case less or no purchased sodium sulfate will be needed.

EXAMPLE 3

Mill A of Example 1 was used in Example 3 to evaluate the integration of the GAP system into pulp mill operations as illustrated in FIG. 4. This option involves the concentration of the portion of the purified sulfuric acid product from the ARU, which will not be used in brownstock acidification, to 70% using vacuum evaporation and recycling it to the generator. In this configuration, the mass balance around the chlorine dioxide generator-APU-Evaporator system for mill A would be as shown in Table 7.

TABLE 7

Mass balance for chlorine dioxide generator-APU-Evaporator System

| Description | Flow, m³/d | $H_2SO_4$, g/L | $Na_2SO_4$, g/L |
|---|---|---|---|
| Spent acid | 67.4 | 476 | 316 |
| APU Salt product | 134.8 | 24.1 | 141.2 |
| APU Acid product | 112.4 | 260.5 | 20.9 |
| Acid to brownstock | 15.4 | 260.5 | 20.9 |
| Acid to evaporator | 97 | 260.5 | 20.9 |
| Evaporator product | 28.1 | 900 | 72 |
| Makeup acid | 7.5 | 1700 | 0 |
| Sodium chlorate feed | 38.2 | 0 | 15 |

By installing an ARU and an evaporator system, mill A will be in a position to achieve complete chlorine dioxide generator system closure. This approach will result in substantial savings being realized with respect to the purchased sulfuric acid as well as the lime mud used to neutralize this excess acid. An additional benefit of this approach is a reduction in sludge disposal costs, since a significant portion of the primary and secondary sludge is undissolved calcium sulfate resulting from the neutralization of excess sulfuric acid by lime.

EXAMPLE 4

The process of FIG. 5 is illustrated through this example. In this case, the purified sulfuric acid from the GAP system of Example 1 was used to regenerate a cation-exchange unit (CEU) used to convert sodium chlorate to a sodium chlorate/chloric acid mixture which is subsequently fed to the chlorine dioxide generator in place of sodium chlorate and sulfuric acid. The partially de-acidified sodium sulfate product of the CEU regeneration step is returned to the recovery cycle for sodium and sulphur make-up thereby decreasing the caustic make-up to the recovery cycle. Alternatively, since this stream contains some residual sulfuric acid, it may be mixed with spent acid prior to treatment with the GAP system.

Tests were conducted using a commercially available CEU known as the DCU (Eco-Tec Inc., Pickering, Ontario, Canada) on a typical acid product from the GAP system processing spent acid from a modified Mathieson chlorine dioxide generator. The pilot plant was equipped with a 5-cm diameter ×60 cm height fixed-resin bed. Extensive previous experience with this unit has shown that the results obtained can reliably predict operation in full scale plants.

Analyses of all chemical species were carried out as follows: acid by titration using phenolphthalein indicator, sulfate by barium chloride titration using sodium rhodizonate indicator, chlorate by iodometric titration, and sodium was calculated by the sum and difference of sulfate, chlorate and acid. In some cases, sulfate in the product was analyzed by a turbidity measurement at 450 nm, or ion chromatography and sodium was analyzed by AA.

The DCU can be operated under different conditions, producing a sodium chlorate/chloric acid mixture from a sodium chlorate feed solution with varying degree of efficiency. The most cost-effective operation for the mill occurs when the amount of chloric acid in the product solution is maximized. As the degree of conversion of sodium chlorate to chloric acid is increased, more sulfuric acid will be needed to regenerate the DCU to the hydrogen form.

Table 8 shows the average overall throughput rates and concentrations of products obtained in this experiment. Slightly diluted purified sulfuric acid from the GAP system of Example 1 (173 g/L $H_2SO_4$ and 22 g/L $Na_2SO_4$) was fed to the DCU (sodium form) at a net feed average rate of 2.7 L/h thereby converting the DCU to the hydrogen form and producing a sodium sulfate-rich regeneration product (101 g/L $Na_2SO_4$ and 83 g/L $H_2SO_4$ with 8g/L residual $NaClO_3$) at 3.0 L/h. In a subsequent step, a concentrated sodium chlorate solution (628 g/L $NaClO_3$) was fed to the DCU (hydrogen form) at 1.5 L/h thereby producing a sodium chlorate/chloric acid mixture (241 g/L $NaClO_3$ and 165 g/L $HClO_3$ with 10.7 g/L $Na_2SO_4$) at a rate of 2.4 L/h. The amount of sulfuric acid fed to the DCU was 2.13 times the stoichiometric amount of acid required to remove the sodium.

TABLE 8

Regeneration of CEU(DCU) using GAP purified sulfuric acid product

| Fraction | Flow L/h | $H_2SO_4$ g/L | $Na_2SO_4$ g/L | NaCl g/L | $HClO_3$ g/L |
|---|---|---|---|---|---|
| Regenerant Acid | 2.7 | 173.5 | 22.5 | — | — |
| Regeneration Product | 3.0 | 82.8 | 100.8 | 8 | — |
| Feed Make-up | 1.5 | — | — | 728.5 | — |
| Product | 2.4 | — | 10.7 | 240.7 | 165 |

The sodium chlorate/chloric acid product of the above experiment was fed to a chlorine dioxide generator operating under the conditions of a Modified Mathieson chlorine dioxide generator. Before introduction into the generator, the total chlorate concentration (sodium chlorate plus chloric acid) in the DCU product was raised to that of the reference case by dissolving solid sodium chlorate in this solution. The results obtained, are shown in Table 9.

TABLE 9

Production of chlorine dioxide from DCU product

| | $H_2SO_4$ g/min. | $ClO_2$ g/min. | $Cl_2$ g/min | HCl g/min. | Yield % | Efficiency % |
|---|---|---|---|---|---|---|
| Reference | 4.9 | 1.26 | 0.1 | 0.05 | 54.3 | 83.6 |
| Fortified DCU Product | 3.17 | 1.24 | 0.06 | 0.08 | 51.7 | 86.1 | where,

Yield=Theoretical $ClO_2$ (based on $SO_2$)/Actual $ClO_2$ produced

Efficiency=$ClO_2/(ClO_2+Cl_2+HCl)$

As seen in Table 9, when the DCU product was fed to the pilot modified Mathieson generator (ICI, Mississauga, Ontario), the sulfuric acid requirement of the generator dropped from 4.9 g/min to 3.17 g/min, a reduction of 35.3%. In addition, the yield and efficiency of the process were not significantly different than the reference case. Moreover, the sulfuric acid content of the generator spent acid decreased by the same fraction as the acid consumption as compared to the reference case.

EXAMPLE 5

The process of FIG. 6 is illustrated through this example. FIG. 6 illustrates a modification of the process shown in FIG. 5, in which, the sodium sulfate regenerant stream, from the CEU is fed to an ARU in order to remove most of its sulfuric acid content thereby producing a de-acidified sodium sulfate solution which is returned to the recovery cycle. Since this stream is de-acidified, it does not destroy alkalinity in pulp mill liquors (black or green liquor) thereby decreasing the caustic make-up requirement to the recovery cycle (white liquor). Water is used to wash off the acid from the ARU producing a sulfuric acid stream which is mixed with the purified acid from the GAP system or sewered.

As in Example 4, in this case, the purified sulfuric acid from the GAP system of Example 1 was used to regenerate the cation-exchange unit (CEU) used to convert sodium chlorate to a sodium chlorate/chloric acid mixture which is subsequently fed to the chlorine dioxide generator in place of sodium chlorate and sulfuric acid.

Tests were conducted using a commercially available DPU (a DCU-APU combination from Eco-Tec, Pickering, Ontario). The DCU and APU beds used were 2"ID×24" h.

Table 10 shows the net average overall throughput rates and concentrations of products obtained in this experiment. Slightly diluted purified sulfuric acid from the GAP system of Example 1 (173 g/L $H_2SO_4$ and 22 g/L $Na_2SO_4$) was fed to the DCU component (sodium form) of the DPU at a feed rate of 2.5 L/h thereby converting the DCU to the hydrogen form and producing a sodium sulfate-rich regeneration product (64 g/L $Na_2SO_4$ and 8 g/L $H_2SO_4$ with 8 g/L residual $NaClO_3$) at 2.7 L/h. In a subsequent step, a concentrated sodium chlorate solution (669 g/L $NaClO_3$) was fed to the DCU component (hydrogen form) of the DPU at 1.2 L/h thereby producing a sodium chlorate/chloric acid mixture (260 g/L $NaClO_3$ and 140 g/L $HClO_3$) at a rate of 1.7 L/h. The IT obtained was 1.21.

TABLE 10

Regeneration of DPU (DCU + APU) using GAP purified sulfuric acid product

| Fraction | Flow L/h | $H_2SO_4$ g/L | $Na_2SO_4$ g/L | $NaClO_3$ g/L | $HClO_3$ g/L |
|---|---|---|---|---|---|
| Regenerant Acid | 2.5 | 173 | 22 | — | — |
| Regeneration Product | 2.7 | 8.5 | 64 | 6.8 | — |
| Feed Make-up | 1.2 | — | — | 669 | — |
| Product | 1.7 | — | — | 260 | 140 |

The sodium chlorate/chloric acid product of the above experiment was fed to a chlorine dioxide generator operating under the conditions of a Modified Mathieson chlorine dioxide generator. Before introduction into the generator, the total chlorate concentration (sodium chlorate plus chloric acid) in the DPU product was raised to that of the reference case by dissolving solid sodium chlorate in this solution. The results were similar to those shown in Table 9.

EXAMPLE 6

In this example, chlorine dioxide generator spent acid was processed through all steps shown in FIG. 2 of the invention. The spent acid used was supplied by a central Canadian mill (mill B) with a Solvay chlorine dioxide generator which is an atmospheric type of generator. We obtained and analyzed samples from the stripper of the generator in April 1996. These data are shown in Table 11. As seen in this Table, the Solvay generator effluent solution contains, in addition to sodium sulfate, sulfuric acid and residual chlorate and chlorine dioxide values, a significantly high concentration of formic acid. This acid is an oxidation product of methanol which is used as the reducing agent in Solvay generators.

TABLE 11

Composition of Solvay generator spent acid at Mill B before and after treatment with sodium sulphite

| | $H_2SO_4$ g/L | HCOOH, g/L | $Na_2SO_4$, g/L | $NaClO_3$, g/L | $ClO_2$, g/L | NaCl, g/L |
|---|---|---|---|---|---|---|
| Before treatment | 444 | 55.6 | 356 | 7.50 | 1.00 | — |
| After treatment | 434 | 55.6 | 399 | 0 | 0 | 5.0 |

In a first step, sodium sulphite was used to destroy the residual sodium chlorate, chlorine dioxide and chlorine in the spent acid; the reaction was complete when the yellow color of the solution totally disappeared. At that point no chlorate, chlorine dioxide or chlorine were detected in this solution. This result may allow the use of a calorimetric sensor for monitoring the disappearance of chlorate, chlorine dioxide and chlorine.

In this case there was no need to pass the treated solution through a filter since no suspended solids were detected when the solution was filtered through a 1.5 μm Whatman glass microfiber filter, type 934/AH).

In a second step, the treated spent acid from the first step was fed to an APU (see example 1). Table 12 shows the net average overall throughput rates and concentrations of products obtained under a set of operating conditions, C, chosen to minimize the amount of acid in the salt product. This was accomplished by using a relatively large volume of water to elute the acid from the resin (5.9 L water/2.3 L feed=2.57). In this experiment, Solvay chlorine dioxide generator spent acid solution (435 g/L $H_2SO_4$, 55.5 g/L HCOOH and 405 g/L $Na_2SO_4$) was fed to the APU at a feed rate of 2.3 L/h and was separated into two streams: a sodium sulfate-rich byproduct stream (197 g/L $Na_2SO_4$, 15.3 g/L $H_2SO_4$ and 0.40 g/L HCOOH) produced at a rate of 4.1 L/h and a sulfuric acid-rich product stream (228 g/L $H_2SO_4$, 31.1 g/L HCOOH and 29.0 g/L $Na_2SO_4$) produced at a rate of 4.1 L/h. Fresh water was added to the APU at 6 L/h to elute the acid-rich product stream from the fixed-resin bed. Although the flow of each stream is intermittent, all flows are expressed as a net overall average. It should be noted in these data that most of the formic acid is eluted from the resin bed with the sulfuric acid; this means that in addition to sulfuric acid, formic acid is recovered as well. One option is to use this stream in brownstock acidification and/or pH adjustment prior to bleaching, in which case the formic acid will provide additional acid values for neutralization purposes to those provided by sulfuric acid. A second option is to concentrate the product acid using evaporation in order to enable its return to the chlorine dioxide generator. We found that, in such a case, the formic acid component will be distilled into the condensate thereby avoiding its accumulation in the chlorine dioxide generator-GAP combination system.

TABLE 12

Throughput rates and composition of products for an APU run, C, in which the feed solution was treated spent acid from a Solvay chlorine dioxide generator

| Fraction | Flow, L/h | $H_2SO_4$, g/L | HCOOH, g/L | $Na_2SO_4$, g/L |
|---|---|---|---|---|
| Salt/Acid Feed | 2.3 | 434 | 55.6 | 400 |
| Salt By-product | 4.1 | 15.3 | 0.40 | 197 |
| Acid Product | 4.1 | 228 | 31.1 | 29.0 |
| Fresh Water Feed | 6.4 | — | — | — |

EXAMPLE 7

In this example, sodium sesquisulfate from a subatmospheric chlorine dioxide generator was dissolved in water and processed through all steps shown in FIG. 2 of the invention. The sodium sesquisulfate used was supplied by a central Canadian mill (mill C) with an R8 chlorine dioxide generator. The subatmospheric generators, such as the R8 and the SVP-LITE, produce relatively small amounts of sulfuric acid as by-product (0.24 t of $H_2SO_4$ /t of $ClO_2$) because they are designed to maintain relatively high free acid concentrations in the generator through vacuum evaporation and continuous precipitation and filtration of the excess sodium sulfate from the reaction solution.

TABLE 13

Throughput rates and composition of products for an APU run, D, in which the feed solution was dissolved sodium sesquisulfate from an R8 chlorine dioxide generator

| Fraction | Flow L/h | $H_2SO4$ g/L | $Na_2SO_4$ g/L |
|---|---|---|---|
| Salt/Acid Feed | 6.3 | 47 | 202 |
| Salt By-product | 8.6 | 9.3 | 131 |
| Acid Product | 6.3 | 35 | 23 |
| Fresh Water Feed | 8.6 | — | — |

Table 13 shows the throughput rates and concentrations of products obtained under a set of operating conditions, D, chosen to minimize the amount of acid in the salt product. This was accomplished by using a relatively large volume of water to elute the acid from the resin. In this experiment, R8 chlorine dioxide generator spent acid (a solution of sodium sesquisulfate) (47 g/L $H_2SO_4$ and 202 g/L $Na_2SO_4$) was fed to the APU at a feed rate of 6.3 L/h and was separated into two streams: a sodium sulfate-rich by-product stream (131 g/L $Na_2SO_4$ and 9.3 g/L $H_2SO_4$) produced at a rate of 8.6 L/h and a sulfuric acid-rich product stream (35 g/L $H_2SO_4$ and 23 g/L $Na_2SO_4$) produced at a rate of 6.3 L/h.

Overall, 90.7% of the sodium sulfate fed into the system was recovered in the salt product stream and 77.8% of the sulfuric acid in the feed solution was recovered in the acid product stream.

EXAMPLE 8

While the GAP system, as shown in Example 7, can effectively achieve the desired objective of reducing the alkali requirements for neutralization of the sodium sulfate which is recycled to recovery, it has one principle disadvantage when applied to the recovery of sulfuric acid from sodium sesquisulfate, the by-product of subatmospheric chlorine dioxide generators. When the sodium sesquisulfate is dissolved to the solubility limit in water, at the optimum temperature, the maximum concentration of sulfuric acid that is produced is only about 5–7% sulfuric acid. When this solution is processed by the fixed-resin bed ARU or most other acid separation systems, the sulfuric acid concentration is reduced to 5% or lower. Recycle of such a dilute sulfuric acid solution to the generator would appreciably increase the evaporation load. The associated energy expense is very unattractive and in many cases the generator may not have sufficient evaporative capacity to handle the load.

This example provides a way to utilize a fixed-resin bed ARU or other acid separation systems (e.g. diffusion dialysis, electrodialysis, nanofiltration) to recover sulfuric acid from sodium acid sulfate salts produced from chlorine dioxide generators, while increasing the concentration of the recovered sulfuric acid.

A tank with a 3-L capacity was equipped with a mixer and a heater suitable for dissolution of sodium acid sulfate saltcake from a subatmospheric chlorine dioxide generator. A fixed-resin bed ARU, known commercially as an APU and manufactured by Eco-Tec Inc., was assembled. The APU was equipped with a resin bed approximately 2 inches in diameter and 24 inches in height. The resin employed was the polystyrene-based quaternary amine strong base type.

The solution was pumped from the dissolving tank into the bottom of the APU resin bed by a hydropneumatic pump. The initial fraction of solution collected from the top of the resin bed, which represents the water void, was collected and supplemented with fresh water for use in the subsequent elution step. The remaining fraction of solution collected from the top of the resin bed, called "by-product", was then collected. Subsequently, water was pumped into the top of the bed. The initial fraction leaving the bottom of the bed called "recycle 1" was recycled to the dissolving tank. The subsequent fraction of solution called "product" was collected. The final fraction of solution collected from the bottom of the bed called "recycle 2" was recycled to the dissolving tank. Approximately 120 grams of sodium sesquisulfate (6.7% moisture) obtained from a chlorine dioxide generator of the R-8/SVP-Lite type was then added to the dissolving tank. The APU was operated for 10 cycles in this manner at which point the composition of the solution in the dissolving tank had reached a steady-state value. The overall average flow rate of each fraction as well as its average composition for the final APU cycle is shown in Table 14.

TABLE 14

Throughput rates and composition of products for an APU run, E, in which the feed solution was dissolved sodium sesquisulfate from an R8 chlorine dioxide generator

| Fraction | flow (L/h) | $Na_2SO_4$ (g/L) | $H_2SO_4$ (g/L) |
|---|---|---|---|
| Salt/Acid Feed | 8.93 | 352.8 | 164.6 |
| Fresh Water Feed | 4.87 | | |
| Water Void | 5.67 | not determined | not determined |
| Salt By-product Out | 3.26 | 276.3 | 8.3 |
| Acid Recycle 1 | 7.26 | 308.4 | 162.5 |
| Acid Product Out | 1.69 | 63.4 | 127.3 |
| Recycle 2 | 1.60 | 28.0 | 72.8 |

Note that the concentration of sulfuric acid in the product (127.3 g/L) is considerably greater than that achievable by simple dissolution of sodium sesquisulfate in water and subsequent treatment by a fixed-resin bed ARU (see Example 7).

The ratio of sulfuric acid to sodium sulfate in the by-product is 0.03 compared to 0.23 in sodium sesquisulfate. Thus, the amount of sulfuric acid in the by-product in relation to the sodium sulfate content is only 13% of that in the original sodium sesquisulfate that is treated. The amount of caustic soda required to neutralize the contained sulfuric acid would, therefore, be reduced by 87%. The amount of sodium sulfate produced by neutralization of the sulfuric acid contained in the sodium sesquisulfate produced by an R-8/SVP-Lite generator is 25% of the total sodium sulfate. By employing this invention, the amount of sodium sulfate produced from the chlorine dioxide generator after neutralization of the sulfuric acid would be reduced by 25%×87%= 22%.

The dead load of sodium sulfate recycled back to the chlorine dioxide generator along with the recovered sulfuric acid product is only 0.5 t/t of sulfuric acid recovered. This is significantly less than with other saltcake recovery processes such as the R-10 process (employing a water solvent) which returns about 1.3 t of sodium sulfate/t of sulfuric acid recovered. The additional evaporation load on the generator would also be significantly less than that of the R-10 type process.

We claim:

1. In a process for the treatment of a chlorine dioxide generator effluent from a chlorine dioxide generator selected from the group consisting of atmospheric generators and sub-atmospheric generators, which effluent contains sulfuric acid and sodium sulfate so as to recover a deacidified sodium sulfate solution and a purified sulfuric acid solution, wherein the improvement comprises:

a. feeding the effluent containing sulfuric acid and sodium sulfate to a fixed-resin bed acid retardation unit incorporating a particulate quaternary ammonium resin wherein the acid is sorbed by the resin and sodium sulfate is rejected to produce a deacidified sodium sulfate solution and recovering said deacidified solution; and b. eluting acid sorbed in said acid retardation unit with water, to recover a purified sulfuric acid solution.

2. A process according to claim 1 wherein said effluent in step a) also contains residual chlorine compounds and including a step of destroying said chlorine compounds with a reducing agent prior to step a).

3. A process according to claim 2 wherein said residual chlorine compounds are one or more of sodium chlorate, chlorine dioxide and chlorine.

4. A process according to claim 1 wherein said deacidified sodium sulfate solution is recycled to a pulp mill recovery cycle for sodium and sulphur chemicals thereby avoiding destruction of alkaline components of pulp mill liquid in said recovery cycle reducing the requirement for make-up sodium hydroxide.

5. A process as claimed in claim 1 wherein the purified sulfuric acid in step b) is recycled to the chlorine dioxide generator.

6. A process as claimed in claim 5 wherein the purified sulfuric acid from step b) is concentrated by an evaporator prior to being recycled to the chlorine dioxide generator.

7. A process as claimed in claim 1 wherein purified sulfuric acid from step b) is fed to a cation-exchange unit for regeneration of cation exchange resin.

8. A process as claimed in claim 1 including a step of exchanging hydrogen ions for sodium ions, with a cation exchange resin, in a sodium chlorate solution fed to the chlorine dioxide generator from which said effluent is derived, with conversion of said resin from an acid form to a sodium form and thereafter regenerating the acid form of the resin with purified sulfuric acid from step b) as regenerant with production of a spent regenerant containing sodium sulfate.

9. A process as claimed in claim 1 wherein the purified sulfuric acid in step b) is fed to a pulp mill operation selected from acidification of brownstock, acidulation of tall oil, pH adjustment prior to pulp bleaching or removal of non-process metals prior to peroxygen pulp bleaching.

10. A process as claimed in claim 8 including a step of treating the spent regenerant containing sodium sulfate with a salt splitter to convert the sodium sulfate to sulfuric acid and sodium hydroxide.

11. A process as claimed in claim 1 wherein said chlorine dioxide generator effluent is that of a Mathieson or modified Mathieson generator; a Solvay generator, or an HP-A generator.

12. A process according to claim 1 wherein said generator is a subatmospheric chlorine dioxide generator and said effluent comprises a saltcake containing said sulfuric acid and said sodium sulfate, and including a step prior to step a) of dissolving said saltcake in an aqueous vehicle and feeding the resulting solution for treatment in step a).

13. A process according to claim 12 wherein said salt cake also contains residual chlorine compounds, and including a step of treating said resulting solution with a reducing agent to destroy the residual chlorine compounds prior to step a).

14. A process as claimed in claim 12 wherein said aqueous vehicle is a sulfuric acid-containing aqueous solution thereby increasing the concentration of sulfuric acid and sodium sulfate therein, and including feeding a portion of the purified sulfuric acid solution from step b) to form at least part of said aqueous vehicle.

15. A process as claimed in claim 12 wherein said aqueous vehicle is water.

16. A process as claimed in claim 14 wherein the temperature of the aqueous vehicle is greater than about 30° C.

17. A process as claimed in claim 14 wherein the sulfuric acid concentration of the solution fed to the acid retardation unit is less than 30% by weight.

18. A process as claimed in claim 12 wherein the purified sulfuric acid from step b) is recycled to the chlorine dioxide generator.

19. A process as claimed in claim 12 wherein a portion of the purified sulfuric acid from step b) is fed to rinse sodium chlorate from sodium acid sulfate crystals filtered from the chlorine dioxide generator solution.

20. A process as claimed in claims 12 wherein the purified sulfuric acid produced by the acid retardation unit is concentrated further by an evaporator prior to being recycled to the chlorine dioxide generator.

* * * * *